US009826031B2

(12) United States Patent
Sirota et al.

(10) Patent No.: US 9,826,031 B2
(45) Date of Patent: Nov. 21, 2017

(54) MANAGING DISTRIBUTED EXECUTION OF PROGRAMS

(71) Applicant: Amazon Technologies, Inc., Reno, NV (US)

(72) Inventors: Peter Sirota, Seattle, WA (US); Richendra Khanna, Seattle, WA (US); Ian P. Nowland, Seattle, WA (US); Richard J. Cole, Seattle, WA (US); Jai Vasanth, Bellevue, WA (US); Andrew J. Hitchcock, Seattle, WA (US); Luis Felipe Cabrera, Bellevue, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 6 days.

(21) Appl. No.: 14/885,776

(22) Filed: Oct. 16, 2015

(65) Prior Publication Data

US 2016/0100001 A1     Apr. 7, 2016

Related U.S. Application Data

(63) Continuation of application No. 14/338,150, filed on Jul. 22, 2014, now Pat. No. 9,207,975, which is a
(Continued)

(51) Int. Cl.
| | | |
|---|---|---|
| *G06F 15/16* | (2006.01) | |
| *H04L 29/08* | (2006.01) | |
| *G06F 9/48* | (2006.01) | |

(52) U.S. Cl.
CPC .......... *H04L 67/1008* (2013.01); *G06F 9/485* (2013.01); *H04L 67/16* (2013.01); *H04L 29/08135* (2013.01)

(58) Field of Classification Search
CPC ............................. H04L 67/16; H04L 67/1008
(Continued)

(56) References Cited

U.S. PATENT DOCUMENTS 6,128,642 A     10/2000     Doraswamy et al.
6,490,693 B1     12/2002     Briskey et al.
(Continued)

FOREIGN PATENT DOCUMENTS

CN     1368809 A     9/2002
CN     101038564 A     9/2007
(Continued)

OTHER PUBLICATIONS

Marozzo et al., "Adapting MapReduce for dynamic environments using a peer-to-peer model", 1st Workshop on Cloud Computing and its Applications, Oct. 23, 2008, retrieved from http://citeseerx.ist.psu.edu/viewdoc/download?doi=10.1.1.157.9239&rep1&type=pdf on Mar. 9, 2016, 7 pages.
(Continued)

*Primary Examiner* — Glenford Madamba
(74) *Attorney, Agent, or Firm* — Seed IP Law Group LLP

(57) ABSTRACT

Techniques are described for managing distributed execution of programs. In some situations, the techniques include determining configuration information to be used for executing a particular program in a distributed manner on multiple computing nodes and/or include providing information and associated controls to a user regarding ongoing distributed execution of one or more programs to enable the user to modify the ongoing distributed execution in various manners. Determined configuration information may include, for example, configuration parameters such as a quantity of computing nodes and/or other measures of computing resources to be used for the executing, and may be determined in various manners, including by interactively gathering values for at least some types of configuration information from an associated user (e.g., via a GUI that is displayed to the user) and/or by automatically determining values for at least some types of configuration information (e.g., for use as recommendations to a user).

20 Claims, 11 Drawing Sheets

Related U.S. Application Data continuation of application No. 12/415,649, filed on Mar. 31, 2009, now Pat. No. 8,819,106, which is a continuation-in-part of application No. 12/334,004, filed on Dec. 12, 2008, now Pat. No. 8,370,493.

(58) Field of Classification Search
USPC .......................................................... 709/217
See application file for complete search history.

(56) References Cited

U.S. PATENT DOCUMENTS

| | | | |
|---|---|---|---|
| 6,934,755 | B1 | 8/2005 | Saulpaugh et al. |
| 7,559,060 | B2* | 7/2009 | Schmidt ................ G06F 9/4887 714/2 |
| 7,590,746 | B2 | 9/2009 | Slater et al. |
| 7,953,843 | B2 | 5/2011 | Cherkasova |
| 2003/0035009 | A1* | 2/2003 | Kodosky ............ G05B 19/0426 715/771 |
| 2003/0237084 | A1 | 12/2003 | Neiman et al. |
| 2004/0181794 | A1 | 9/2004 | Coleman et al. |
| 2004/0210907 | A1 | 10/2004 | Lau et al. |
| 2006/0009945 | A1 | 1/2006 | Fuller, III et al. |
| 2007/0174815 | A1 | 7/2007 | Chrysanthakopoulos et al. |
| 2007/0260733 | A1 | 11/2007 | Havemose et al. |
| 2007/0271570 | A1 | 11/2007 | Brown et al. |
| 2007/0277056 | A1 | 11/2007 | Varadarajan et al. |
| 2008/0082983 | A1 | 4/2008 | Groetzner et al. |
| 2008/0114887 | A1 | 5/2008 | Bryers et al. |
| 2008/0115143 | A1 | 5/2008 | Shimizu et al. |
| 2008/0120314 | A1 | 5/2008 | Yang et al. |
| 2008/0250227 | A1 | 10/2008 | Linderman et al. |
| 2009/0024981 | A1* | 1/2009 | Dye .......................... G06F 8/34 717/105 |
| 2009/0037572 | A1* | 2/2009 | Gebhart .................. G06F 9/455 709/224 |
| 2009/0083390 | A1 | 3/2009 | Abu-Ghazaleh et al. |
| 2009/0237084 | A1 | 9/2009 | Itskovich et al. |
| 2010/0076805 | A1 | 3/2010 | Batsakis et al. |
| 2010/0122065 | A1 | 5/2010 | Dean et al. |

FOREIGN PATENT DOCUMENTS

| | | |
|---|---|---|
| JP | 63-85846 A | 4/1988 |
| JP | 8-123768 A | 5/1996 |
| JP | 2008-502953 A | 1/2008 |
| JP | 2008-123357 A | 5/2008 |
| JP | 2008-293358 A | 12/2008 |

OTHER PUBLICATIONS

"AmazonEC2—Hadoop Wiki," retrieved on Dec. 12, 2008, from http://wiki.apache.org/hadoop/AmazonEC2?action=print, 10 pages.
"Hadoop," retrieved on Dec. 12, 2008, from http://en.wikipedia.org/wiki/Hadoop, 5 pages.
"MapReduce," retrieved on Dec. 12, 2008, from http://en.wikipedia.org/wiki/Mapreduce, 6 pages.
"Storage Area Network," retrieved on Dec. 12, 2008, from http://en.wikipedia.org/wiki/Storage_area_network, 5 pages.
"RAID," retrieved on Dec. 12, 2008, from http://en.wikipedia.org/wiki/RAID, 14 pages.
Varia, "Building GrepTheWeb in the Cloud, Part 1: Cloud Architectures," Jul. 16, 2008, retrieved Dec. 12, 2008, from http://developer.amazonwebservices.com/connect/entry!default.jspa?categoryID=152&ex . . . , 8 pages.
Varia, "Building GrepTheWeb in the Cloud, Part 2: Best Practices," Jul. 15, 2008, retrieved Dec. 12, 2008, from http://developer.amazonwebservices.com/connect/entry!default.jspa?categoryID=152&ex . . . , 3 pages.
White, "Running Hadoop MapReduce on Amazon EC2 and Amazon S3," Jul. 18, 2007, retrieved Dec. 12, 2008, from http://developer.amazonwebservices.com/connect/entry.jspa?externalID=873, 7 pages.
"Condor Project Homepage," retrieved on Mar. 26, 2009, from http://www.cs.wisc.edu/condor/, 3 pages.
"What is Condor?" retrieved on Mar. 26, 2009, http://www.cs.wisc.edu/condor/description.html, 2 pages.
"An Overview of the Condor System," retrieved on Mar. 26, 2009, from http://www.cs.wisc.edu/condor/overview/, 4 pages.
"Welcome to Hive!" retrieved on Mar. 26, 2009, from http://hadoop.apache.org/hive/, 1 page.
"Hive—Hadoop Wiki," retrieved on Mar. 26, 2009, from http://wiki.apache.org/hadoop/Hive?action=print, 2 pages.
"Project Pig," retrieved on Mar. 26, 2009, from http://research.yahoo.com/node/90, 1 page.
Olston et al., "Pig Latin: A Not-So-Foreign Language for Data Processing," SIGMOD, Jun. 9-12, 2008, Vancouver, BC, Canada, 12 pages.
Badrinath et al., "Virtualization Aware Job Schedulers for Checkpoint-Restart," International Conference on Parallel and Distributed Systems, Piscataway, NJ, Dec. 5, 2007, 7 pages.
Casas et al., "MPVM: A Migration Transparent Version of PVM," Computing Systems, vol. 8, No. 2, Spring 1995, 46 pages.
Mehnert-Spahn et al., "Checkpointing Process Groups in a Grid Environment," 2008 Ninth International Conference on Parallel and Distributed Computing, Applications and Technologies, Dec. 1-4, 2008, 9 pages.
Wang et al., "The Cumulus Project: Build a Scientific Cloud for a Data Center," Cloud Computing and Applications, Oct. 22-23, 2008, Chicago, Ill., 7 pages.
Hua et al., "Distributed Layered Resource Management Model in Blue Whale Distributed File System," *Journal of Computer Research and Development* 42(6):1034-1038, 2005.
Nakajima et al., "Design of a scalable programming environment for large capacity computing in a large P2P grid environment," *IPSJ SIG Technical Report* 2006(87):115-120, Information Processing Society of Japan, Japan, Aug. 1, 2006.
Dean et al., "MapReduce: Simplified Data Processing on Large Clusters," Google, Inc., OSDI 2004, 2004, 13 pages.

* cited by examiner

Example DPES Program Execution Configuration Information

Please enter information about your program to be executed ⎬ 201

202a { Display Name [         ]

202b {
- Input Data Location [         ]
- Output Data Location [         ]
- Input Data Decryption Key (optional) [         ]
- Output Data Encryption Key (optional) [         ]

202c {
- ☒ Use selected pre-defined program execution template [         ▼]
- ☐ Use custom program at indicated location [         ]

202d {
- ☐ Use default configuration parameters for selected pre-defined program execution template (recommended)

OR
- ☐ Use selected configuration parameters below

- Number of nodes [         ]
  - Type of nodes [         ▼]
  - Degree of data replication (optional) [         ]
  - ⋮

⎬ 202

203 [ Initiate Program Execution ]    204 [ Cancel ]

*Fig. 2A*

Example Current Status for Distributed Execution of Program X

Program X Execution and Data State Information

| 210a | 210b | 210c | 210d | 210e | 210f | 210g |
|---|---|---|---|---|---|---|
| Node | Job | Operation | Input Data | Output Data | Status | |
| A | J-A | A01 | D-A01 | D-A11 | completed | |
| A | J-A | A02 | D-A02 | D-A12 | in progress | |
| A | J-A | A03 | D-A11 | D-A21 | in progress | |
| A | J-A | A04 | D-A12 | D-A22 | queued | |
| ... | | | | | | |
| B | J-B | B01 | D-B01 | D-B11 | completed | |
| B | J-B | B02 | D-B02 | D-B12 | in progress | |
| B | J-B | B03 | D-B11, D-B12 | D-B21 | queued | |
| B | J-B | B04 | D-B12 | D-B22 | queued | |
| ... | | | | | | |
| C | J-C | C01 | D-C01 | D-C11 | completed | |
| C | J-C | C02 | D-C02 | D-C12 | in progress | |
| C | J-C | C03 | D-C11, D-C12 | D-C21 | queued | |
| C | J-C | C04 | D-C12 | D-C22 | queued | |
| ... | | | | | | |
| D | J-D | D01 | D-D01 | D-D11 | in progress | |
| D | J-D | D02 | D-D02 | D-D12 | in progress | |
| ... | | | | | | |

*Fig. 2C*

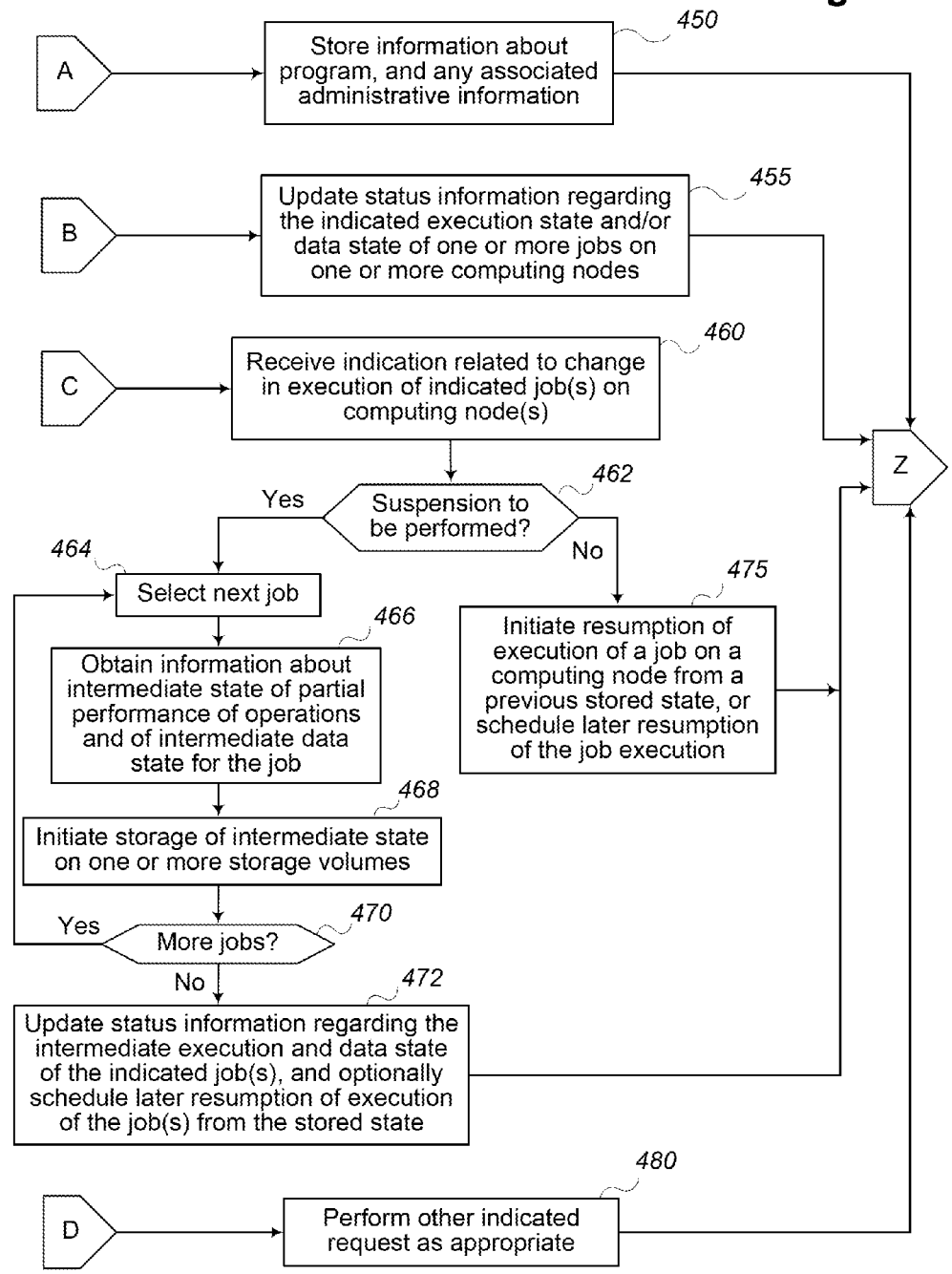

MANAGING DISTRIBUTED EXECUTION OF PROGRAMS

CROSS-REFERENCE TO RELATED APPLICATIONS

This application is a continuation of U.S. patent application Ser. No. 14/338,150, filed Jul. 22, 2014, and entitled "Managing Distributed Execution of Programs," now U.S. Pat. No. 9,207,975, which is a continuation of U.S. patent application Ser. No. 12/415,649, filed Mar. 31, 2009 and entitled "Managing Distributed Execution of Programs," now U.S. Pat. No. 8,819,106, which is a continuation-in-part of U.S. patent application Ser. No. 12/334,004, filed Dec. 12, 2008 and entitled "Saving Program Execution State," which is incorporated herein by reference.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). Such groups of interconnected computing systems are increasingly useful for various reasons, including to support increasingly large software programs and input data sets that may be distributed across multiple computing systems.

Various approaches have been taken to providing groups of interconnected computing systems. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

BRIEF DESCRIPTION OF THE DRAWINGS

FIGS. 2A-2C illustrate examples of managing the configuration and tracking of distributed program execution on multiple computing nodes.

FIGS. 4A and 4B illustrate a flow diagram of an example embodiment of a Distributed Program Execution Service System Manager routine.

DETAILED DESCRIPTION

Figure 1A:
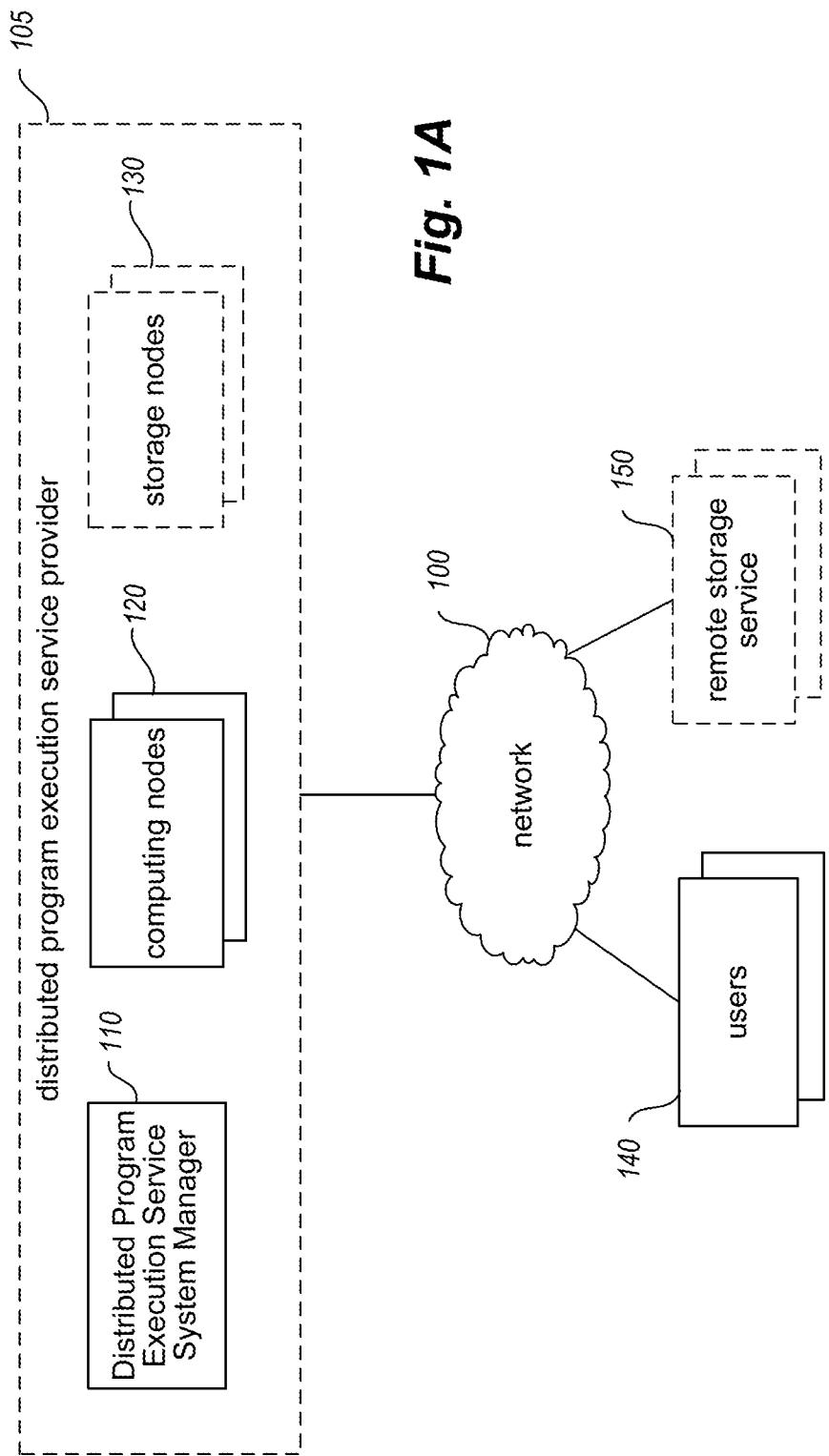
FIGS. 1A and 1B are network diagrams illustrating example embodiments of use of a distributed program execution service by remote users.

Techniques are described for managing distributed execution of programs.

In at least some embodiments, the techniques for managing the distributed execution of a particular program include determining configuration information to be used to execute that program in a distributed manner on multiple computing nodes, including configuration parameters such as a quantity of computing nodes and/or other measures of computing resources to be used for the executing. Such configuration information for executing a particular program may be determined in various manners in various embodiments, including by interactively gathering at least some types of configuration information from an associated user (e.g., via a graphical user interface, or GUI, that is provided and displayed to the user) and/or by automatically determining values for at least some types of configuration information (e.g., for use as recommendations to a user, for use as part of the configured program execution without user input, etc.). In addition, in at least some embodiments, the techniques for managing the distributed execution of a program include tracking information about ongoing distributed execution of one or more programs, and providing such tracked information and associated controls to a user (e.g., via a GUI that is provided and displayed to the user) to enable the user to modify the ongoing distributed execution in various manners, such as to temporarily terminate or otherwise suspend some or all of the ongoing distributed execution. Additional details related to managing the distributed execution of programs are included below.

In addition, in at least some embodiments, some or all of the techniques may be automatically performed by embodiments of a Distributed Program Execution Service System Manager module, as described in greater detail below, such as a module that supports an embodiment of a distributed program execution ("DPE") service for executing multiple programs on behalf of multiple customers or other users of the service. In at least some embodiments, such a DPE service may provide various computing nodes (e.g., multiple physical computing systems and/or virtual machines that are hosted on one or more physical computing systems) for use in executing programs for users in a distributed manner.

The distributed execution of a program may be initiated and configured in various manners in various embodiments, such as by a user interacting with an embodiment of a DPE service to request the execution of the program in a manner specified by the user. For example, the DPE service may provide a GUI that a remote user interactively uses to make the execution request (e.g., a Web-based GUI with which a user interacts via a client application, such as a Web browser, executing on a client device of the user), and/or the DPE service may provide one or more APIs ("application programming interfaces") that enable a computing device and program of the user to programmatically interact with the DPE service to make the request (e.g., one or more APIs that are also used by the provided GUI). The user may specify various information as part of such a request, such as an indication of the program to execute (e.g., by supplying an executable copy of the program, by indicating a program previously registered by the user with the DPE service, by indicating a program made available by the DPE service for use by users, etc.), and an indication of input data for use by the executing program (e.g., by supplying the input data or by indicating an accessible location from which the input data may be obtained). An executable copy of a program may be supplied in various manners and formats, such as, for example, a Java ARchive ("JAR") file.

In addition, the user may further specify other configuration parameters for the distributed program execution in at least some embodiments, such as one or more of the following: an indication of a quantity of computing nodes to use for the requested execution; an indication of a type of computing node to use for the requested execution (e.g., if the DPE service provides different types of computing nodes with different capabilities, such as different amounts of memory, storage and/or processing power) and/or one or more other execution criteria to use in performing the requested execution (e.g., a user-specified QoS, or Quality of Service, level associated with the requested execution; an indication of a time by which the requested execution is to be completed; etc.); information about a location or layout of some or all of the computing nodes to use for the requested execution, such as relative to each other, to indicated data and/or to some other location (e.g., to be within a specified degree of geographical or network distance), or instead in an absolute manner (e.g., at a particular data center or other geographical location, within the boundaries of a country or other indicated geographical area, etc.); access information for use in communicating with one or more of the computing nodes, such as an SSH ("secure shell") key; configuration information for use in configuring a particular instance of the program for use with the requested execution; an indication of multiple execution jobs into which the indicated program execution is to be separated for parallel or other distributed execution, or instead an indication of how the DPE service is to automatically determine those multiple execution jobs (e.g., if the indicated program is designed to be separable in a defined manner into distinct execution jobs, such as based on an execution methodology used by or other design of the program); etc. More generally, in at least some embodiments, a user may be able to specify other more general high-level execution criteria that indicate desired outcomes from the execution or other factors to be considered for the execution (e.g., to complete execution as cheaply as possible within some indicated time period, to complete execution as quickly as possible with a specified maximum associated fee, to complete execution in a manner that attempts to optimize one or more other types of indicated factors, etc.), and the DPE service may automatically determine to provide preferred or otherwise appropriate execution configuration parameters to use to satisfy those execution criteria, as discussed in greater detail below. Furthermore, in at least some embodiments, the DPE service may further automatically determine some or all such configuration parameters for the distributed execution of a particular program, such as for use in warning a user if user-specified configuration parameters are sub-optimal or otherwise problematic (e.g., are insufficient to complete the execution by a desired time indicated by the user), or for otherwise recommending configuration parameters to the user. The automatic determining of such configuration parameters may be performed in various manners in various embodiments, such as based on the DPE service monitoring and assessing previous related program executions for various users that use differing configuration parameters (e.g., execution of the same program, such as for a program provided by the DPE service for use by users; execution of other programs of the same or similar type, such as that use the same design or execution methodology; etc.) in order to identify one or more preferred sets of configuration parameters for a particular program or particular program type. Additional details related to configuring the distributed execution of a program are included below.

The ongoing distributed execution of one or more programs for a user may also be tracked and modified in various manners in various embodiments, such as by a user interacting with an embodiment of a DPE service to modify ongoing distributed program execution in a manner specified by the user. For example, the DPE service may provide a GUI that a remote user may interactively use to view status information related to ongoing distributed program execution and/or to make a distributed program execution modification request (whether the same GUI as used for configuring program execution or instead a distinct GUI), and/or may provide one or more APIs ("application programming interfaces") that enable a computing device and program of the user to programmatically interact with the DPE service to obtain such tracked information and make such modification requests (e.g., one or more APIs that are also used by the provided GUI for use in modifying execution). The types of distributed program execution modifications that may be performed may vary in various embodiments and situations, including to modify various previously specified configuration parameters for an distributed program execution (e.g., a quantity of computing nodes to use for the ongoing distributed execution), to suspend and optionally later resume some or all of the ongoing distributed execution, etc. Additional details related to modifying the ongoing distributed execution of a program are included below.

FIG. 1A is a network diagram that illustrates an example of a DPE service that manages distributed execution of programs for multiple users. For illustrative purposes, some examples and embodiments are described below in which specific types of management of distributed program execution are provided in specific manners. These examples are provided for illustrative purposes and are simplified for the sake of brevity, and it will be appreciated that the inventive techniques may be used in a wide variety of other situations, some of which are described in greater detail below. For example, while particular examples of how to configure the execution of programs in distributed manners and to modify the ongoing distributed execution of programs are described, other types of distributed execution and of configuring and modifying may be used in other embodiments. In addition, while in some embodiments users initiate the execution of indicated programs in a distributed manner, in other embodiments an embodiment of the DPE service may initiate the execution of such indicated programs and/or may determine to execute a program indicated by a user in a distributed manner (e.g., without knowledge of the user). Furthermore, in some embodiments at least some of the described techniques may be used with at least some programs that are not executed in a distributed manner, such as to configure execution of such a non-distributed program and/or to modify partial execution of such a non-distributed program.

In the example of FIG. 1A, a number of users 140 are interacting over a network 100 with an illustrated embodiment of a Distributed Program Execution Service System Manager ("DPE Service SM" or "DPESSM") module 110 to initiate distributed execution of programs on one or more computing nodes 120 that are available for executing programs of the users, such as a DPESSM module 110 that provides some or all of the functionality of a particular embodiment of a DPE service (not shown). The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the DPESSM module 110 and the computing nodes 120 are provided by a DPE service provider 105 as part of a DPE service, as well as one or more optional other storage nodes 130, and the DPESSM module 110 may execute on one or more other computing systems (not shown).

Figure 1B:
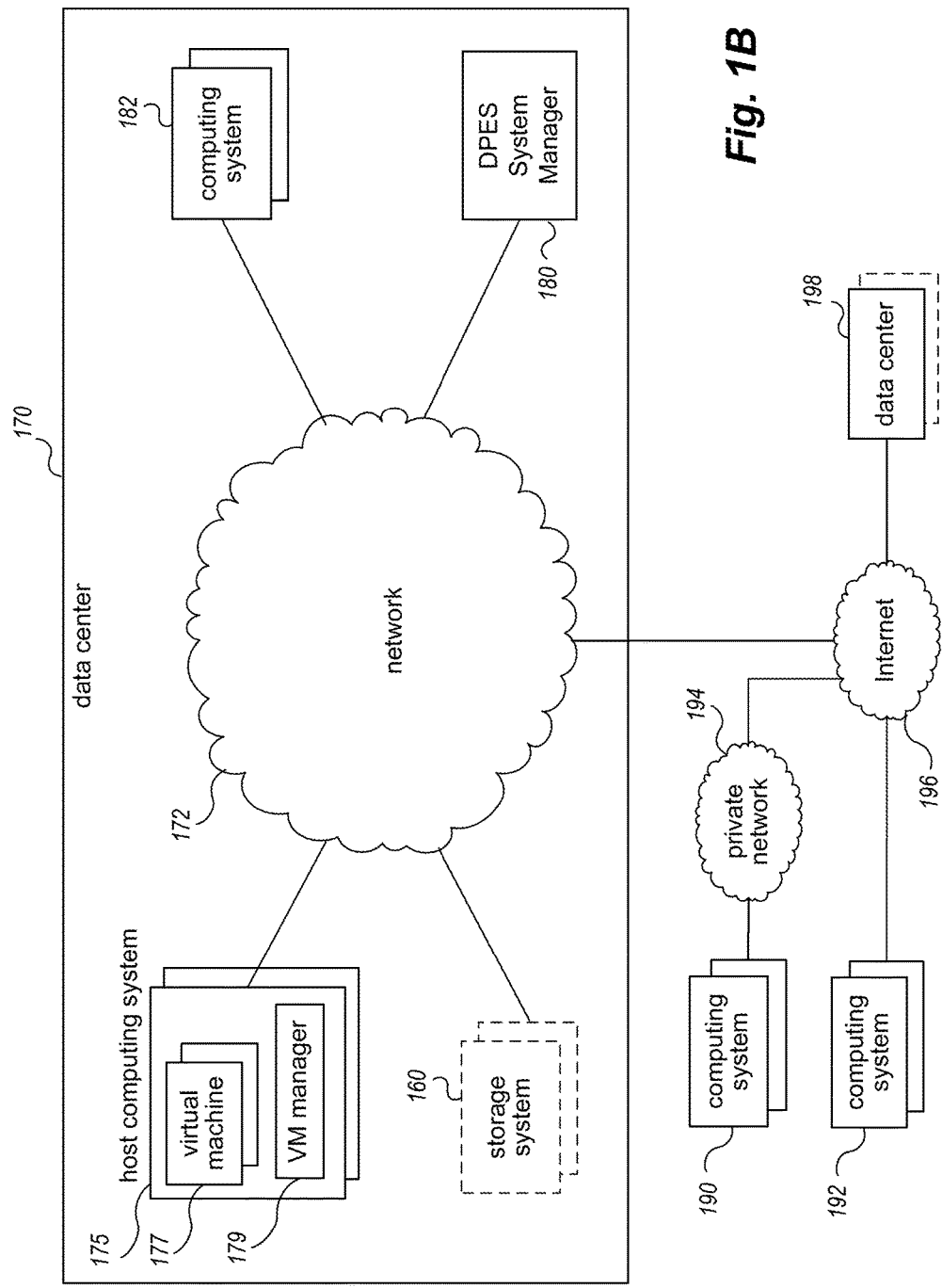

In some embodiments, the illustrated computing nodes 120 are provided by the DPE service provider 105 for distributed execution of programs on behalf of the users, and may include multiple physical computing systems and/or multiple virtual machines that are hosted on one or more physical computing systems (e.g., as is described in more detail with respect to FIG. 1B for one example embodiment). Each of the computing nodes 120 has some amount of computing resources available for executing one or more programs, such as may be measured, for example, by a combination of one or more of processing capacity (e.g., number and/or size of processing units), memory capacity, storage capacity, network bandwidth capacity, disk I/O ("input/output") capacity, etc. In some embodiments, the DPE service provider 105 may provide preconfigured computing nodes, with each preconfigured computing node having similar and/or equivalent amounts of resources available for executing programs on behalf of users, while in other embodiments, the DPE service provider 105 may provide a selection of various different computing nodes, such as with different types or groups of computing nodes having varying amounts and/or types of computing resources (e.g., size, speed and/or type of processing units; number of processing units; amount of memory and/or storage; platform configuration, such as 32-bit or 64-bit; etc.).

Figure 2B:
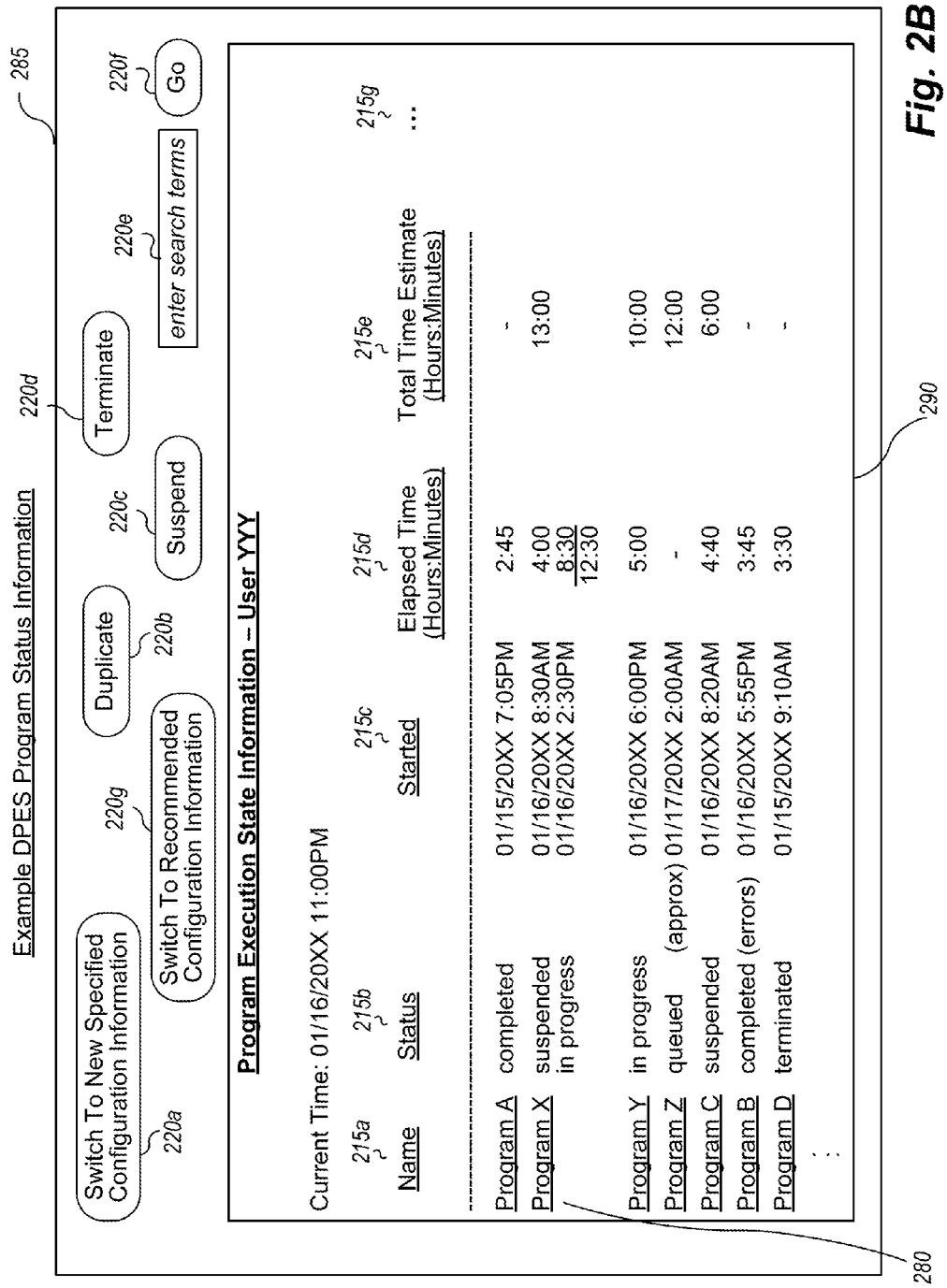

In the illustrated embodiment, the various users 140 may interact with the DPESSM module 110 to make requests and specify various information, with FIGS. 2A-2C illustrating examples of GUI screens and associated user-selectable controls that may be displayed to users for certain types of interactions. In various embodiments, such user requests and specifications may be made at various times, such as when a user registers to use services of the DPE service and/or at later times. For example, the DPESSM module 110 may provide subscription and/or registration services to one or more users, such that users may specify information related to one or more programs to execute on behalf of a user (e.g., programs, source code, network addressable locations of one or more programs, etc.), account information (e.g., user name, billing information, etc.), terms of use, etc. In some embodiments, after a user interacts with the DPESSM module 110 to subscribe and/or register for services, the user may be issued one or more identifiers (e.g., keys, tokens, user names, etc.) that are associated with the user and are to be used in conjunction with executing programs on behalf of the user. In other embodiments, a module other than the DPESSM module 110 may be provided to perform various operations related to subscription and/or registration services of the DPE service.

In addition, the users may interact with the DPESSM module 110 to initiate and configure execution of programs in various ways in various embodiments, such as by specifying a number and/or type of computing nodes for execution of programs, a minimum and/or maximum number of computing nodes to use, a preferred execution time and/or period of execution, an expiration time for the program execution request, a selection of one of multiple priorities for the execution (e.g., with associated fees that increase with increased priority), etc. Furthermore, in some embodiments, a user may interact with the DPESSM module 110 to request immediate execution of one or more programs on a specified number of computing nodes and/or to schedule such execution at one or more future times, such that the DPESSM module 110 may initiate the requested execution on the specified number of computing nodes at a specified time or when one or more other specified criteria are satisfied (e.g., when it is determined that a specified number of computing nodes are available).

In this illustrated embodiment, the DPE service provides a variety of functionality for managing distributed execution of programs for multiple users on the computing nodes 120. For example, as previously noted, a particular user may use a GUI or API provided by the module 110 to submit a request for execution of an indicated program using indicated input data, and optionally along with a variety of other types of configuration information. After the request for execution of the program is received, the DPESSM module 110 may select which of the available computing nodes 120 to use for the requested execution in various ways. For example, in some embodiments, the module 110 may simply select an appropriate quantity of computing nodes from any of the available computing nodes with sufficient resources, such as, for example, by randomly selecting from a pool of available computing nodes. In other embodiments, one or more specific computing nodes may be selected on the basis of one or more other factors, such as, for example, a predicted length of and/or likelihood of continued availability of the one or more computing nodes, a physical proximity of the one or more specific computing nodes to one or more other computing nodes, a geographic location of the one or more specific computing nodes and/or of one or more other computing nodes, etc. In addition, after the request is received, the module 110 may further determine how to separate the indicated program into multiple execution jobs to be executed on the multiple selected computing nodes, such as by using information supplied by the user and/or in an automatic manner based on previously obtained information about the design of the indicated program. Similarly, in at least some embodiments and situations, the module 110 may determine how to separate the indicated input data into multiple subsets for use by the multiple execution jobs. For example, in some situations, each execution job may include executing a full copy of the indicated program but on a particular subset of input data, while the other execution jobs similarly execute the full program copy functionality on other input data subsets. Alternatively, in some situations, various execution jobs may perform different functions on a single common set of input data.

As the execution jobs execute on the various computing nodes, the execution jobs store various information locally on the computing nodes in at least some embodiments. In addition, the DPE service may optionally provide one or more storage nodes 130 that are used by the DPE service to store information related to program execution and/or for other purposes. As discussed in greater detail elsewhere, such information stored on the storage nodes 130 may include status information regarding the intermediate state of partial execution of various execution jobs for various programs, and in some embodiments may optionally include output data that is generated by completed execution jobs. Furthermore, as discussed in greater detail elsewhere, in some embodiments the module 110 may provide indications to cause the intermediate state of partial execution of one or more execution jobs to be persistently stored before the partial execution of the execution job is temporarily terminated or otherwise suspended. Such intermediate state information for the partial execution may be stored in various manners remotely from the computing node on which the partial execution occurred, such as by copying such intermediate state information to one or more of the optional storage nodes 130 and/or by using one or more optional remote storage services 150 that are accessible over the network 100. In some embodiments, the module 110 coordinates the storage of the intermediate state information from the computing node to the remote persistent storage location, such as by using information that the module 110 tracks about the intermediate state of the partial execution, while in other embodiments the activities in performing the persistent storage of the intermediate state information may instead be performed by management software executing on the computing node to locally manage the execution of the execution job. Alternatively, if a particular executing execution job is able to store its own intermediate execution state, the module 110 may instead notify the execution job to perform its own intermediate execution state storage actions before shutting down its own execution.

After the intermediate state of partial execution of an execution job has been persistently stored and the partial execution has been terminated, the partial execution may be resumed from that suspended intermediate state at a later time, such as substantially immediately (e.g., if the execution of the execution job is being moved from a first computing node to a second computing node, as quickly as the intermediate state information may be stored and retrieved), or instead after a longer period of time (e.g., at a later scheduled time, a later time when one or more specified criteria are satisfied, etc.). At the time of execution resumption, the stored intermediate state information may be retrieved from the persistent storage location, and locally stored on or otherwise made available to the computing node on which the execution job execution is to resume. In addition, the partial execution of the execution job may be resumed in various manners, such as by indicating to the execution job not to perform a subset of operations that were previously completed (e.g., if the execution job supports such functionality), by modifying the execution job to only perform a subset of the operations that were not previously completed, etc. Additional details related to the suspension and resumption of execution of execution jobs are described elsewhere.

FIG. 1B illustrates an embodiment in which a DPE service may be provided using one or more data centers that include multiple physical computing systems. In particular, FIG. 1B is a network diagram illustrating an example embodiment in which a DPESSM module 180 of a DPE service manages distributed execution of programs on behalf of users at an example data center 170. The example data center 170 is connected to the Internet 196 external to the data center 170, which in this example provides access to various external computing systems, such as computing systems 190 via private network 194 and other directly accessible computing systems 192. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, one or more other data centers 198 are illustrated that are connected to data center 170 via the Internet 196, such as may further be used by the DPE service in at least some embodiments. For example, the distributed execution of a particular program may include simultaneous and/or sequential execution using computing nodes at multiple data centers or other distinct geographical locations, including to move execution of an execution job from a computing node at one geographical location to a computing node at another geographical location.

The example data center 170 includes a number of physical host computing systems 175, physical computing systems 182, optional storage systems 160, and a DPESSM module 180 of an embodiment of the DPE service. In this example, host computing systems 175 each provide multiple virtual machines 177 and have a virtual machine ("VM") manager module 179 to manage those virtual machines (e.g., a hypervisor or other virtual machine monitor), and some or all of the computing systems 182 may similarly have one or more such virtual machines and/or VM manager modules (not shown). Such virtual machines may each act as a computing node for use by the DPE service. Alternatively, in other embodiments, some or all of the physical host computing systems at the data center may not provide any virtual machines, such as to instead act as a computing node that directly executes one or more programs on behalf of end user customers of the DPE service. In addition, in some embodiments, the physical host computing systems 175 and/or physical computing systems 182 may each include other management software (e.g., a management module of the DPE service, such as part of or distinct from the VM manager modules) to manage the execution of execution jobs on the computing systems. Furthermore, in some embodiments various of the computing systems 175 and 182 may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, one or more such factors may further be used as constraints and/or preferences regarding which computing systems to select for executing particular programs. The optional storage systems 160 may also have various forms, such as computing systems with attached storage (e.g., that may also be used as computing nodes at times), network storage devices that are not used as computing nodes, etc. The example data center 170 further includes an internal network 172 that may include multiple networking devices (not shown), such as switches, edge routers, and core routers, with computing systems 175 and 182, storage systems 160, and the DPESSM module 180 connected to the internal network 172.

The illustrated DPESSM module 180 performs at least some of the described techniques in order to manage distributed execution of programs using the computing systems 175 and 182, and to optionally persistently store at least some program execution results on storage systems 160. For example, the DPESSM module 180 may provide a GUI or other functionality that enables remote users to configure distributed program execution and/or to track and optionally modify ongoing distributed program execution, such as for users (not shown) of computing systems 190 or 192 or at one of the other data centers 198. When a particular computing node or system is selected to execute one or more execution jobs of a program, the DPESSM module 180 may in some embodiments initiate execution of the execution jobs by interacting with a VM manager module or other manager module that controls execution of programs for that selected computing node/system, or may alternatively directly execute the execution jobs on the selected computing node/system. In addition, some of the computing systems 190 or 192 or at one of the other data centers 198 may be used to provide one or more network-accessible remote storage services (not shown) that are accessible by the DPE service and used to persistently store at least some intermediate results or other information.

It will be appreciated that the data center of FIG. 1B is provided for illustrative purposes only, and that an embodiment of a DPE service and other software execution services may be provided in other manners in other embodiments. For example, DPESSM module 180 may instead be provided using one or more other computing systems external to the data center 170, such as computing systems 190, 192 or at a data center 198. In addition, in at least some embodiments, the programs for which distributed execution is provided may include executable software images, such as virtual machine images that are bootable or otherwise loadable on one or more virtual machine computing nodes, and that each may include operating system software, software for one or more application programs, and/or configuration information, etc. At least some such programs may be stored by the DPE service and/or by users on the storage systems 160 and/or using a remote storage service, and if so are retrieved by or supplied to the DPE service when they are to be executed on behalf of a user or as otherwise initiated. Furthermore, while only a limited number of devices are illustrated in this example, it will be appreciated that in a typical arrangement, data center 170 may include hundreds or thousands of host computing systems such as those illustrated here, organized into a large number of distinct physical networks with a large number of networking devices (e.g., in a hierarchical manner).

As previously noted, FIGS. 2A-2C illustrate examples of GUI screens and associated user-selectable controls that may be displayed to users by some embodiments of a DPE service to enable the users to specify configuration information for use in distributed execution of indicated programs and/or to track and optionally modify ongoing distributed program execution.

In particular, FIG. 2A illustrates a first group of information that may be displayed to a user as part of one or more screens of a provided GUI of the DPE service (e.g., as part of one or more Web pages), such as to enable the user to configure and initiate distributed execution of an indicated program. In this example, the displayed information includes instructions 201, and a section 202 in which the user may specify various types of configuration information related to an indicated program whose distributed execution is to be initiated. The types of configuration information in this example include a display name 202a (e.g., for later use when displaying status information to the user regarding the ongoing execution of the program, such as is illustrated with respect to FIG. 2B), and various information 202b regarding input and output data for the program execution. In this example, the user may specify a network-accessible location at which the input data is stored (e.g., in a remote network storage service) for retrieval and use by the DPE service, although in other embodiments access to the input data may be specified in other manners (e.g., by having the user enter additional information for use in accessing the input data from the indicated location, such as a password, additional location or structure information for the indicated location, etc.; by providing a mechanism for the user to interactively upload or otherwise enter the input data; etc.). Furthermore, in the illustrated example, the user may specify an optional decryption key that the DPE service may use to decrypt stored input data that is encrypted, or may otherwise specify information for use by the DPE service in accessing and using encrypted or otherwise protected information. In a similar manner, the user may specify a network-accessible location in section 202b at which output data generated by the program execution is to be stored, whether the same as or different from the location of the input data, and may further specify an optional encryption key that the DPE service is to use to encrypt the output data before storage. In other embodiments, the handling of the output data by the DPE service may be specified in other manners, such as to display or otherwise provide the generated output data to the user without storage, to programmatically send the output data to an executing program of the user, etc.

In addition to the configuration information 202a and 202b, the illustrated example GUI screen includes a section 202c via which the user may indicate the program to be executed, and optionally provide information related to the type of the program. In particular, the DPE service may provide information about multiple predetermined types of programs in some embodiments, such as to correspond in this example to programs that the DPE service makes available for use by users, and the user may select one of those predetermined program types to use via a dropdown list control. If the user selects such a predetermined program type for a program that is made available by the DPE service, the selection indicates the program that will be used for the distributed execution in the manner configured by the user. The particular predetermined types of programs may be identified in various ways in various embodiments, such as by being specified by an operator of the DPE service (e.g., by configuring the DPE service to make programs of those types available), by being identified during operation of the DPE service (e.g., based on program types that are explicitly specified by users or on types of programs that are uploaded and used by the users), etc. Furthermore, in the illustrated example, the predetermined program types each have an associated predefined execution template that includes a preferred group of configuration parameters for that type of program, such as may be previously specified by a human operator of the DPE service and/or automatically determined by the DPE service (e.g., based on heuristics and/or data from monitoring previous execution of that type of program), may be previously identified by one or more users, etc. In other embodiments, some or all of the predetermined types of programs may be of other types (e.g., common types of programs provided by users), and a non-exclusive list of examples of program types includes the following: Web indexing and other indexing of documents or other information; data mining; log file analysis and the analysis of other types of information; machine learning (e.g., on Monte Carlo simulations or other random data sampling); scientific simulation (e.g., to identify genome pairs); conversion of data from one format to another; data warehouse queries or other queries of large datasets; etc. In other embodiments, the DPE service may not allow users to upload custom programs and/or may not provide particular programs that are available for users to use. Alternatively, if the user specifies a custom program or the DPE service does not maintain information about multiple types of predetermined programs, other information about the program type may be obtained in other manners in at least some embodiments, such as by displaying additional fields (not shown) via which the user may specify other information about the program and its type (e.g., a particular execution methodology used for the program, a type of language and/or runtime environment used by the program, etc.), and/or by the DPE service doing an automated analysis of the custom program (e.g., a similarity comparison to other programs with known program types) in an attempt to determine information about the program type.

The illustrated example GUI screen further includes a section 202d via which various execution configuration parameters may be specified by the user. In this example, the user indicated in section 202c to select one of the predetermined program types (although a particular selected predetermined program type is not shown), which has an associated predefined group of execution configuration parameters that are recommended for use with the selected program. Accordingly, the user man select in section 202d in this example to use those recommended parameters, or may instead specify some or all other configuration parameters using other input fields of section 202d. For example, the user may in this example indicate one of multiple predefined computing node types made available by the DPE service and a quantity of those multiple computing nodes to use. Furthermore, in this example the user may optionally indicate a degree of replication for the DPE service regarding how many copies (if any) to maintain of intermediate data during program execution, and in other embodiments may specify a variety of other types of configuration parameters (e.g., memory allocation to be used for particular programs, a debugging loglevel, etc.), as discussed in greater detail elsewhere. While not illustrated in this example, recommended execution configuration parameter information for the selected program may also be used in other manners in some embodiments, such as to display a warning to a user if the user has selected execution configuration parameters that differ from the recommended parameters (e.g., if the user has selected more or less computing resources than appear to be needed to complete the program execution in an optimal or desired manner), to display to the user as default values for the various execution configuration parameters (which the user may optionally opt to use or to modify), etc. The example user interface may in some embodiments further be configured to provide other types of error messages or other information in other situations, such as based on particular entries for particular user-specifiable fields.

After the various user-specified configuration information has been entered, the user in this example submits the information to the DPE service to initiate the distributed execution of the indicated program by clicking on the user-selectable "Initiate Program Execution" control 203, or alternatively uses the user-selectable "Cancel" control 204 to cancel the initiation of the program execution. The DPE service will attempt to begin distributed program execution substantially immediately in this example, in accordance with the specified execution configuration parameters and other specified configuration information, or otherwise as soon as sufficient computing resources are available based on the specified configuration information. The DPE service may further determine that the initiated program execution fails if sufficient computing resources for the configuration are not available within a specified period of time, and if so may provide a corresponding error or other information to the user via the GUI. In other embodiments, the user may further specify other information to indicate a delayed execution or other scheduled execution at an indicated time, as well as specify various other types of information (e.g., a maximum or desired time of program execution completion, a maximum or desired cost related to program execution completion, etc.), and if so the DPE service will similarly use that information in an appropriate manner.

FIG. 2B illustrates a second group of information 285 that may be displayed to a user as part of one or more other screens of a provided GUI (e.g., as part of one or more Web pages) of the DPE service, such as to enable the user to track and optionally modify ongoing distributed execution of one or more program associated with the user. In this example, the displayed information includes a section 290 that provides various status information for various programs associated with the user (in this example, User YYY), and FIG. 2C provides additional status details regarding one of the programs that is selected by the user. In addition, the information 285 includes various user-selectable controls 220 in this example that the user may use to modify ongoing distributed execution of the programs or perform other indicated actions. In particular, in this example, the user may use the "Suspend" control 220c to temporarily suspend the ongoing in-progress execution of a selected program, and the "Terminate" control 220d to permanently terminate the ongoing in-progress execution of a selected program, and in some embodiments may further use a "Resume" control (not shown) to resume the execution of a selected suspended program, whether immediately or at an indicated future time. Other displayed controls in this example allow the user to specify changed configuration parameters or other configuration information for the ongoing execution of a program via control 220a (e.g., by displaying one or more other UI screens, not shown, to gather that configuration information, such as in a manner similar to that of FIG. 2A), such that the DPE service will modify the ongoing distributed program execution in accordance with the changed configuration information; to specify via control 220g for the DPE service to modify the ongoing distributed program execution in accordance with configuration information recommended by the DPE service (e.g., in accordance with previously specified high-level execution criteria from the user, such as may be determined at a previous time when the high-level execution criteria was specified or instead dynamically at a time of the section of control 220g; based on a type of the program; based on information about the distributed execution of the program that has already occurred, such as may be gathered based on monitoring activities of the DPE service; etc.); to perform a search among DPE service information (e.g., among the programs whose status information is shown in section 290, among all predetermined program types, etc.) via controls 220e and 220f, and to initiate execution of a new program by duplicating at least some of the specified configuration information of a selected program via control 220b. Furthermore, while not illustrated in this example, in other embodiments other types of controls may be provided, such as to enable the user to initiate execution of a new program in other manners (e.g., to display the GUI screen previously illustrated with respect to FIG. 2A), to modify ongoing program execution in other manners (e.g., to specify one or more high-level execution criteria for which the DPE service will automatically determine appropriate execution configuration parameters), etc. It will be appreciated that other types of controls may be displayed in other embodiments, and that controls may be displayed and used in various manners in various embodiments.

In this example, the status information 290 includes information about 7 programs associated with the current user, with the information for each program including the following: a name 215a; an overall program status 215b (e.g., "completed", "suspended", "in progress", "queued" for execution, "terminated", "completed (errors)", etc.); a start time 215c (which may be an approximate future start time for a queued program whose execution has not yet started, and which may have multiple entries if the program execution has been suspended and resumed at least once); an elapsed amount of actual execution time 215d; a total estimated amount of execution time 215e until completion (which is not shown for programs whose execution is completed, since the elapsed execution time for those programs reflects the total execution time); and optionally one or more other types of status information 215g (e.g., an indication of a percentage completion of the program execution; an indication of the completion or current execution of one or more phases or stages for a multi-phase or multi-stage application execution, respectively; etc.). It will be appreciated that a variety of other types of status information may be displayed in other embodiments, including information about fees that have already been incurred in executing a particular program, estimated total fees for completing the execution of a particular program etc. In this example, the name of each program may also be a selectable link that the user may use to obtain additional status information specific to that program, with FIG. 2C illustrating an example of additional status information for example Program X based on user selection of link 280 of FIG. 2B, although in other embodiments particular programs may be selected in other manners.

FIG. 2C illustrates status information 210 that is specific to Program X, such as whose display may be initiated based on selection of link 280 of FIG. 2B. The status information 210 may be displayed in various manners, such as part of the same one or more GUI screens that are displayed with respect to FIG. 2B, or instead as part of one or more other GUI screens. While not illustrated, various user-selectable controls may further be displayed with the status information 210, such as controls similar to those of controls 220 of FIG. 2B. In this example, the status information 210 includes various execution state information regarding the distributed execution of Program X, such as to track the status of execution of execution jobs on the multiple computing nodes used for the distributed execution. In particular, in this example, each line or entry in the information 210 corresponds to the performance of a particular operation for a particular execution job on a particular computing node, with information being tracked that in this example includes an identification 210a of the computing node, of the execution job 210b, of the operation 210c, of the status of performance 210f of the operation, of input data 210d to be used by the operation, of output data 210e to be produced by the performance of the operation, and optionally of various other information 210g. Such other status information may include, for example, information about dependencies or other inter-relationships between operations (e.g., operation B cannot be executed until after operation A is completed, operations C and D are to be executed simultaneously, etc.), information about expected completion of performance of an operation being performed (e.g., an expected completion time, an expected amount of time until completion, a percentage completion of an operation, a percentage of the operation that remains to be performed, etc.), information about expected initiation of performance of operations that are not yet being performed, etc. Various other types of information may similarly be displayed for Program X, such as information about one or more master nodes that control execution of the execution jobs on the various multiple computing nodes and that store various status information for the distributed execution, a graphical depiction of some or all of the various multiple computing nodes, etc.

In this example, the multiple computing nodes include, for example, Node A, and the execution of an example execution job J-A has been initiated on that computing node. In this example, execution job J-A includes operations to be performed that include at least example operations A01, A02, A03, and A04, and the first four entries in the status information 210 correspond to these operations for this execution job and computing node. In this example, operation A01 has already been completed, and during its performance it used input data D-A01 and produced output data D-A11. Operation A03 uses that output data D-A11 as input data, and is in progress of being performed to produce output data D-A21, but that output data has not yet been completed. Similarly, operation A02 is in progress and is using input data D-A02 to eventually produce output data D-A12. Because operation A04 uses that output data D-A12 as input data, operation A04 is queued and ready to be executed when its input data and Node A are available to perform it, but the performance of operation A04 has not yet begun. Similar status information is illustrated for other computing nodes, execution jobs and operations.

While not illustrated in this example, in some embodiments and situations, different users or other entities may be involved in different parts of the distributed execution of a program, such as to have a first user initiate distributed execution of a program, a second user initiate a first suspension of execution of that program, a third user initiate a first resumed execution of that program, etc. Such two or more different users may, for example, represent a single entity, not represent the same entity but be affiliated in one or more other manners (e.g., based on working together), have authorization that has been granted to perform specified actions for other users, etc.

It will be appreciated that the information in the examples of FIGS. 2A-2C has been provided for illustrative purposes only, and various details have been shown in an abstract manner or not illustrated for the sake of understanding. Furthermore, it will be appreciated that while only a limited number of computing nodes and execution jobs have been illustrated in FIG. 2C, in actual embodiments the actual quantities may be much larger, such as to include hundreds or thousands or millions of computing nodes and/or execution jobs.

As previously noted, the DPE service may provide various functionality to perform distributed execution of programs for users. For example, after program execution is requested or otherwise initiated, whether by a user or in another manner, that program execution may be separated into multiple execution jobs for parallel or other distributed execution in various manners in various embodiments. For example, as previously noted, the program may be designed to be separable in a defined manner into distinct execution jobs (e.g., to support task-level parallelism), and if so a user may indicate how to generate multiple execution jobs and/or the DPE service may automatically generate the multiple execution jobs. Furthermore, some types of programs may perform various operations on each of a number of pieces of input data, and in such situations, data parallelism techniques may be used to separate the group of input data for use in the program execution into multiple subsets that are each supplied to a distinct execution job (e.g., with each execution job performing some or all of the same operations on the input data subset used for that execution job). As one simple example, a particular program execution may include searching a large number of Web pages for two particular terms (or alternatively indexing the Web pages for use in later searches), and the program execution could be separated into a large number of execution jobs that execute simultaneously in parallel to each search (or index) a distinct subset of the Web pages (e.g., a single Web page, or a small number of the Web pages) for one or both of the terms. Non-exclusive examples of types of programs that may be separated into multiple execution jobs (e.g., to support task parallelism and/or data parallelism) include the MapReduce program for processing and generating large data sets, the Hadoop program implementation of MapReduce execution methodology, the Hive data warehouse infrastructure that uses Hadoop, the Pig structured query language for use with HDFS ("Hadoop Distributed File System") data, the HBase open-source distributed database, various types of image, video and speech processing, various types of analysis of and searching through textual data sets or other types of input data, etc. Additional details related to the MapReduce program are included in "MapReduce: Simplified Data Processing on Large Clusters" by Jeffrey Dean and Sanjay Ghemawat, December 2004, Proceedings of OSDI'04: Sixth Symposium on Operating System Design and Implementation, available at the time of application filing at labs<dot>google<dot>com<slash>papers<slash>map-reduce-osdi04.pdf (where "<dot>" and "<slash>" are replaced with corresponding characters "." and "/"), which is incorporated herein by reference in its entirety.

In addition, in at least some embodiments, the managing of the distributed execution of a program may include monitoring or otherwise tracking the ongoing execution of some or all execution jobs for the program, such as to determine when particular execution jobs begin execution and complete execution. Such tracking of the execution of execution jobs may provide various benefits, such as to determine when to later initiate execution of other execution jobs (e.g., if the output data generated by a first execution job is at least some of the input data for a second execution job, so as to assist in determining when to execute the second execution job), and/or to determine when all execution jobs of a program have been completed. Furthermore, in at least some embodiments, some or all execution jobs may each have multiple distinct operations (which also may be referred to as "tasks" in some situations) that are to be performed, such as in a sequential and/or parallel manner, and the monitoring or other tracking of the ongoing execution of such execution jobs may further include determining information about the status of the partial performance of some or all such operations, such as to reflect intermediate data that is generated by completed performance of some such operations. Such tracking of the performance of particular operations for an execution job may further provide various benefits, such as to enable the ongoing intermediate execution and data state from the partial execution of the execution job to be tracked and used, as described in greater detail below. The monitoring or other tracking may be performed in various manners, such as by using a system manager module to initiate execution of execution jobs on particular computing nodes, and to subsequently obtain status information from the computing nodes (e.g., by the system manager module pulling status information from the computing nodes, such as by periodically requesting status information from each computing node, and/or by the computing nodes pushing status information to the system manager module, such as periodically or when particular events occur).

When executing an execution job for a program on a computing node, various information related to the execution may be stored in various manners. For example, when the execution is initiated, the input data to be used by the execution job may be locally stored on the computing node (e.g., on a local hard disk or other local storage device) to facilitate access to that input data during execution, and any software instructions to be executed for the execution job may similarly be locally stored on the computing node. Such information to be locally stored may be supplied to the computing node under control of the system manager module of the DPE service, such as from a highly available long-term storage location for the DPE service that is remote from the multiple computing nodes used to execute the program (e.g., a long-term storage location that is available from a network-accessible remote storage service). In addition, after the execution of the execution job is completed and any output data from the execution is generated, that output data may similarly be locally stored on the computing node, such as temporarily until that output data is copied back to the long-term storage location for the DPE service for use by other execution jobs or otherwise in generating the final output results for the execution of the program. After the execution of the execution job of the program is completed, the local storage on the computing node may in some embodiments be erased or otherwise cleared after any output data from the execution is copied back to the DPE service's long-term storage location, such as in preparation for or as part of initiating execution of another execution job on the computing node (e.g., another execution job of a different program for a different user). In other embodiments, the local storage on the computing node may instead be maintained even after the execution of an execution job is completed (e.g., until execution of the program is complete).

Furthermore, in at least some embodiments, various intermediate output data and other intermediate results from the partial execution of an execution job on a computing node may be temporarily stored locally on the computing node during the execution, such as to correspond to output data produced by a subset of the operations of the execution job whose performance is completed, and/or to correspond to partial or incomplete output data produced by one or more operations whose performance has been initiated but not completed. In at least some embodiments in which a long-term storage location of the DPE service is used, such intermediate results are not stored on the DPE service's long-term storage location (e.g., to minimize execution delay and network traffic involved in copying such intermediate results to the DPE service's long-term storage location), while in other embodiments some or all such intermediate results may be stored on the DPE service's long-term storage location.

As one example of intermediate results, referring back to the prior simplified example of an execution job that involves searching through multiple Web pages for two terms, each operation of the execution job may correspond to searching through a single Web page for a single term, with the intermediate output data from performance of such an operation being information about any occurrences of that term in that Web page (e.g., a cumulative number of times that the term is located; information about each occurrence of the term in that Web page, such as its location in the Web page; etc.). Alternatively, as another example, a particular execution job may involve searching through a Web log or other transaction record that has numerous entries (e.g., with each line in the Web log representing an entry) for a particular term, and each operation of the execution job may involve searching a particular input data entry for that term, with the intermediate output data from performance of such an operation similarly including information about whether the input data entry includes the term.

By storing the output data from the completed execution of an execution job in the DPE service's long-term storage location, the availability of that output data may be maintained even if a particular computing node subsequently fails or otherwise becomes unavailable. However, if intermediate results from partial execution of an execution job are not stored on the DPE service's long-term storage location, a termination of the execution of that execution job before completion could result in those intermediate results being lost, such that the execution job would need to later be executed again from the beginning (e.g., to repeat performance of all operations of the execution job, even if some of the operations were previously completed). Accordingly, distributed execution of a program is managed by the DPE service in at least some embodiments in such a manner as to store and use such intermediate results from partial execution of an execution job that is temporarily terminated or otherwise suspended before completion, so that a later resumption of the execution of the execution job may resume at or near the intermediate point of partial execution before termination. For example, if a determination is made to terminate execution of one or more execution jobs of a program on one or more computing nodes before the execution of those execution jobs is complete, the system manager component may initiate the persistent storage of the intermediate results from the partial execution of those execution jobs, such as at a location remote from those computing nodes. When the execution of those execution jobs is later resumed, whether on those same computing nodes or other computing nodes, the persistently stored intermediate results from the prior partial executions may be retrieved and used in the resumed execution in various ways. For example, if multiple operations of a particular terminated execution job had been completed before the termination, the intermediate results from the performance of those operations may be retrieved for the resumed execution, and those completed operations need not be performed again for the resumed execution.

The termination of partially completed execution jobs may be performed for various reasons in various embodiments. For example, in some embodiments a user who has requested execution of a program may request that the execution of some or all execution jobs for the program be suspended, such as for an indicated period of time or until the user later requests a resumption of the program suspension. In other embodiments, the DPE service may initiate the termination of the execution of one or more execution jobs of a program. For example, the execution of an execution job on a first computing node may be terminated and moved to another second computing node, such as if the first computing node is to be shut down for maintenance, is to be used for another execution job or other program (e.g., another execution job or other program with a higher priority), is being over-utilized, is showing signs of possible failure, etc. In addition, in a manner similar to that of the indicated user request, the DPE service may determine to suspend all execution of a program for a period of time.

In addition, as previously noted, in at least some embodiments, execution of an execution job that is automatically terminated may be automatically resumed at a later time by the DPE service. For example, in some such cases, the DPE service may continue to try to execute such an execution job until completion of the requested execution, until execution is cancelled or otherwise explicitly terminated by a user, until occurrence of a specified time (e.g., until occurrence of an expiration time, until occurrence of a cumulative execution time, etc), until occurrence of a specified number of executions, indefinitely, etc. In addition, in at least some such embodiments, at least some execution jobs that are automatically terminated may be automatically resumed on behalf of the user at a future time when a sufficient amount of program execution capacity again becomes available to continue the execution.

As previously noted, various information may be locally stored on a computing node during execution of an execution job, and the locally stored information may be stored in various manners. For example, in some embodiments, a distributed file system or other distributed data store may be created on the multiple computing nodes used for distributed execution of a program, with a particular computing node's locally stored data being stored in the local portion of that distributed data store. Furthermore, if the distributed data store for a particular embodiment includes redundant data that allows for recovery of the data locally stored on a particular computing node that fails or otherwise becomes unavailable, then the availability of the output data from the execution of an execution job may be maintained in many situations for that embodiment even without the use of separate long-term storage for the DPE service. In other embodiments, some or all information may be stored in other manners, such as by not using a long-term storage location of the DPE service (e.g., by maintaining locally stored data on computing nodes until all execution for the program is completed) and/or by not using local storage on the computing nodes selected to assist in the distributed execution of a program (e.g., by storing any information that is not loaded in volatile memory on the computing node at a remote location, such as the DPE service's long-term storage location).

In addition, when intermediate results of partial execution on a computing node are persistently stored remotely from the computing node, the intermediate results may be stored in various manners. In some embodiments in which the DPE service uses a long-term storage location, the intermediate results may be stored in the DPE service's long-term storage location along with other completed results of execution jobs that have been completed. Alternatively, in some embodiments, the intermediate results for a particular computing node may be stored together, but in a manner distinct from the intermediate and/or completed results of other computing nodes. For example, in some embodiments, a remote logical storage volume may be created to mirror some or all of a local hard disk or other block data storage device for the computing node that was used to store the intermediate results, including a local portion of a distributed file system or other distributed data store. When the partial execution of the execution job for the computing node is later resumed, such a remote logical storage volume may be attached to the computing node on which the resumed execution is to occur, such as to allow the information in the attached logical storage volume to be copied to a physical block storage device of that computing node for use during the resumed execution, or the attached logical storage volume may instead be used during the resumed execution in lieu of any physical block storage device of that computing node. In some such embodiments in which logical storage volumes are available for use, the logical storage volumes may be created at the time of termination of an execution job on a computing node, while in other embodiments the logical storage volume for an execution job may be created at the beginning of the initial execution of the execution job on a computing node and used throughout the entire execution (e.g., in lieu of any physical block storage device of that computing node), even if the execution of the execution job is terminated and resumed one or more times.

Additional details related to the operation of examples of remote storage services that may be used to persistently store program state information and/or other information, including logical storage volumes, are available in U.S. patent application Ser. No. 12/188,943, filed Aug. 8, 2008 and entitled "Providing Executing Programs With Reliable Access To Non-Local Block Data Storage;" and in U.S. patent application Ser. No. 11/371,304, filed Mar. 8, 2006 and entitled "Distributed Storage System With Web Services Client Interface" and claiming priority benefit of U.S. Provisional Patent Application No. 60/754,726 filed Dec. 29, 2005, each of which is hereby incorporated by reference in its entirety. In addition, additional details related to example embodiments of executing different programs of different priorities at different times and to techniques for suspending and resuming distributed execution of programs are included in U.S. patent application Ser. No. 12/334,022, filed Dec. 12, 2008 and entitled "Managing Use Of Program Execution Capacity," and in U.S. patent application Ser. No. 12/334, 004, filed and entitled "Saving Program Execution State," each of which is hereby incorporated by reference in its entirety. Furthermore, additional details related to automatically monitoring and modifying distributed program execution are included in U.S. patent application Ser. No. 12/415, 773, filed Mar. 31, 2009, and entitled "Dynamically Monitoring And Modifying Distributed Execution Of Programs," which is also hereby incorporated by reference in its entirety.

In addition, as previously discussed, the managing of distributed execution of programs may be performed in various manners in various embodiments. For example, the determination of which computing nodes to use for execution of a program may be made in a variety of ways, including based on any preferences and/or requirements specified in configuration information that accompanies initiation of program execution or otherwise specified for the program and/or associated user (e.g., at a time of registration, etc.). For example, if criteria are determined for preferred and/or required resources for execution of a program (e.g., memory and/or storage; CPU type, cycles or other performance metric; network capacity; platform type, etc.), the selection of appropriate computing nodes to use may be based at least in part on whether the computing nodes have sufficient resources available to satisfy those resource criteria. In at least some situations, the multiple computing nodes selected for the distributed execution of an indicated program are referred to as a "cluster," and the initiation of the distributed execution of the indicated program on the cluster by the DPE service includes some or all of the following non-exclusive actions: selecting multiple computing nodes to be used as the cluster to perform the distributed execution of the indicated program; identifying one or more of the multiple nodes of the cluster to act as master nodes that control the execution of the program on the other nodes of the cluster; provisioning the multiple computing nodes of the cluster if needed to prepare them to receive software to be executed and input data to be used; obtaining the indicated input data to be used by the distributed execution of the indicated program; separating the obtained input data into multiple subsets that are each to be used on one of the multiple computing nodes of the cluster; separating the indicated program into multiple execution jobs to be executed on the multiple computing nodes of the cluster; for each of the multiple computing nodes, loading on the computing node software and optionally input data to be used for the distributed execution of the indicated program (e.g., software to execute at least one execution job for the computing node and a determined subset of the indicated input data to be used by the computing node); optionally configuring the loaded software on the various computing nodes (e.g., configuring the software loaded on the one or more master computing nodes to be able to use the other computing nodes of the cluster); establishing access controls for the multiple computing nodes of the cluster that enable the multiple computing nodes to inter-communicate as part of the executing of the indicated program; etc. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In some embodiments, fees may be associated with the use of a DPE service, such that the DPE service may perform distributed execution of programs on behalf of a user in exchange for payment of one or more fees by that user. For example, in some embodiments, fees may be charged to a user based on an amount and/or type of distributed program execution capacity allocated for executing one or more programs on behalf of a user, such as based on one or more of a number of computing nodes, a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. Fees may also be charged on the basis of a variety of use factors in some embodiments, such as a price per use of the service, a price per unit of time that computing services are used, a price per storage used, a price per data transferred in and/or out, etc. In at least some embodiments, a provider of a DPE service may offer one or more of various tiers, types and/or levels of services or functionality for distributed execution of programs on behalf of multiple users, and in some such embodiments, various fees may be associated with the various tiers, types and/or levels of services. Additional details related to various fees associated with a distributed program execution service are included in pending U.S. patent application Ser. No. 11/963,331, filed Dec. 21, 2007 and entitled "Providing Configurable Pricing for Execution of Software Images," which is hereby incorporated by reference in its entirety.

In addition, as previously noted, in at least some embodiments the DPE service provides an API to enable users to programmatically configure the distributed execution of programs and to modify ongoing distributed program execution. The following include non-exclusive examples of functions that may be provided as part of such an API: describe-cluster; run-cluster; terminate-cluster; set-cluster-proxy; upload-mapped-jar; upload-data; start-program; cancel-program; and get-program-status, in which "cluster" refers to a group of multiple computing nodes being used as part of the distributed execution of an indicated program, and "jar" refers to a file containing the indicated program to be executed. Furthermore, in at least some embodiments users may be enabled to configure a variety of characteristics for their clusters, including, for example, a degree of replication regarding how many copies (if any) to maintain of intermediate data during program execution, memory allocation to be used for particular programs (e.g., for use with a Java virtual machine), a loglevel for which information is tracked during debugging, etc. It will be appreciated that an API may include other functionality and be defined in other manners in other embodiments, and that the various functions of the API may each have appropriate variables or parameters whose values are specified as part of invoking the function.

In addition, in at least some embodiments, the DPE service may provide other types of functionality in at least some situations. For example, a user may initiate the distributed execution of a first program on a cluster of multiple nodes, but may maintain the cluster of multiple nodes even after the distributed execution of the first program has ended. One reason that the user may maintain the cluster is to execute a distinct second program on the existing cluster after the first program has ended, such as a second program that uses the same or similar configuration (e.g., the same type of program but with a new input data set), or instead a second program that uses generated results or other output data from the execution of the first program as input data for the distributed execution of the second program. As another example, in some embodiments, a user may be allowed to specify input data for use in the distributed execution of a program that is not static, such as if the input data continues to grow or expand while the program is executing—one example is a log file for a Web site or data that indicates ongoing transactions, with the distributed execution of the program analyzing each entry in the log or transaction data, such that the new log/transaction entries are analyzed as they are received (or later if the processing of the log/transaction data has not yet reached those new entries at the time of their receipt). Furthermore, in some embodiments a user may specify one or more types of limits regarding the distributed execution of a program (e.g., an amount of execution time; a cost of execution; an amount of usage of one or more types of computing resources, such as memory, storage, disk I/O, network I/O; etc.), with various specified types of actions that the DPE service is to take if a specified limit is reached (e.g., to notify the user, to suspend or terminate execution of the program, to reduce usage of a type of resource corresponding to the limit, etc.).

Furthermore, various other types of functionality may be provided and used by a DPE service in various embodiments, as discussed in greater detail elsewhere.

Figure 3:
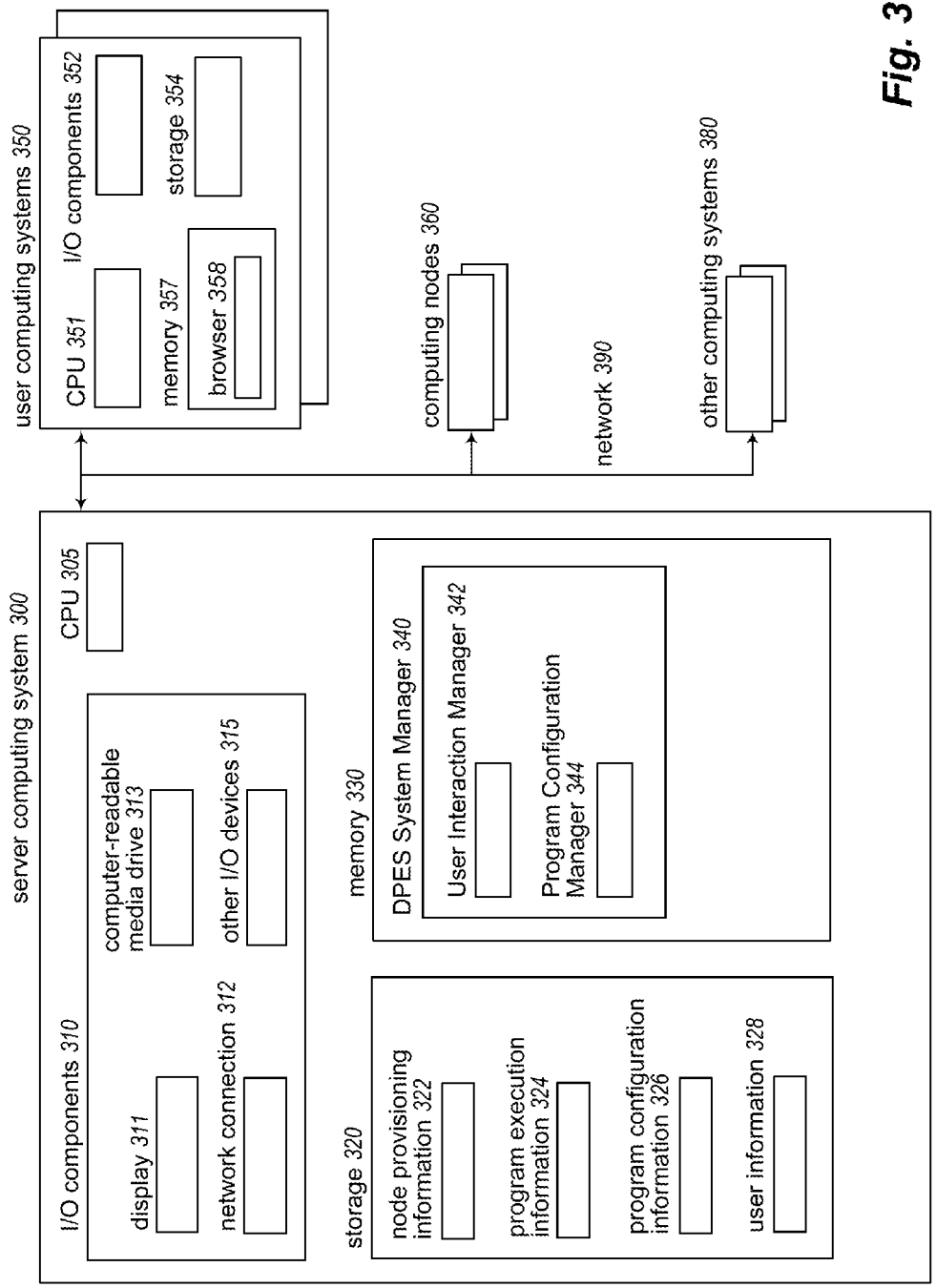
FIG. 3 is a block diagram illustrating an example embodiment of a computing system for managing distributed program execution.

FIG. 3 is a block diagram illustrating an example embodiment of a system suitable for performing techniques to manage distributed execution of programs. In particular, FIG. 3 illustrates a server computing system 300 suitable for executing an embodiment of a Distributed Program Execution Service System Manager module, as well as various user computing systems 350, computing nodes 360, and other computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352 (although particular components are not illustrated), storage 354, and memory 357. The other computing systems 380 and computing nodes 360 may also each include similar components to some or all of the components illustrated with respect to server computing system 300, but such components are not illustrated in this example for the sake of brevity.

An embodiment of a Distributed Program Execution Service System Manager module 340 is executing in memory 330, such as under control of CPU 305, and it interacts with computing systems 350 and 380 and computing nodes 360 over the network 390 (e.g., via the Internet and/or the World Wide Web, via a private cellular network, etc.). In this example embodiment, the DPESSM module 340 includes functionality related to managing distributed execution of programs on computing nodes 360 by various users (not shown) interacting with user computing systems 350, such as in conjunction with a DPE service managed by the DPESSM module 340. The other computing systems 350 and 380 and computing nodes 360 may be executing various software as part of interactions with the DPESSM module. For example, user computing systems 350 may be executing a Web browser 358 or other software in memory 357 to interact with DPESSM module 340, such as to interact with a User Interaction Manager module 342 of the DPESSM module to configure and/or request execution of programs on behalf of the users of those systems on one or more computing nodes 360 in various ways, and/or to track and optionally modify ongoing distributed execution of programs. In addition, one or more users of the user computing systems 350 may interact with DPESSM module 340 to perform various other types of actions, as discussed in greater detail elsewhere.

Various information related to the operation of the DPESSM module 340 may be stored in storage 320, such as information 322 related to the computing nodes used to execute particular programs, information 328 about users of the distributed program execution service, information 324 that includes information about program execution (e.g., final execution results from program execution that has been completed, status information about the intermediate state of partial execution of various programs, etc.), and user-specified and other configuration information 326 used to configure distributed execution of programs (e.g., specified execution configuration parameters). In addition, various intermediate state information and other information may be persistently stored in various manners, as discussed in greater detail elsewhere, including on storage 320 of server computing system 300, on other computing systems 380, or on other computing nodes/systems or storage nodes/systems (not shown).

After the DPESSM module 340 receives requests (or other indications) to execute one or more programs on one or more computing nodes 360, along with specified configuration information, the DPESSM module 340 selects the computing nodes that will perform the distributed execution of the one or more programs, and initiates execution of execution jobs of those programs on those computing nodes 360. In addition, the DPESSM module 340 may further interact with computing nodes 360 to temporarily terminate or otherwise suspend execution of execution jobs on the computing nodes and to resume previously terminated execution, such as in response to user instructions. The DPESSM module 340 may also monitor or otherwise interact with one or more of the computing nodes 360 to track use of those computing nodes. Furthermore, the Program Configuration Manager module 344 of DPESSM module 340 may use information gathered from the monitoring of the distributed execution of various programs to facilitate configuring the distributed execution of other programs, such as by determining preferred execution configuration parameters for particular predetermined types of programs and/or by determining recommended execution configuration parameters for particular indicated programs. The Program Configuration Manager module 344 may further interact with the User Interaction Manager module 342 in some situations, such as to provide determined configuration information, while in other embodiments such determined configuration information may be stored by module 344 as part of configuration information 326, and retrieved and used by module 342 from the stored configured information 326. Additional details related to these operations are included elsewhere.

The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the DPESSM module 340 may interact with one or more other computing systems 380 to initiate, suspend or resume execution of one or more programs on those computing systems, such as if the computing systems 380 are provided by one or more third-party participants.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated DPESSM module 340 may in some embodiments be distributed in additional modules. Similarly, in some embodiments some of the functionality of the DPESSM module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
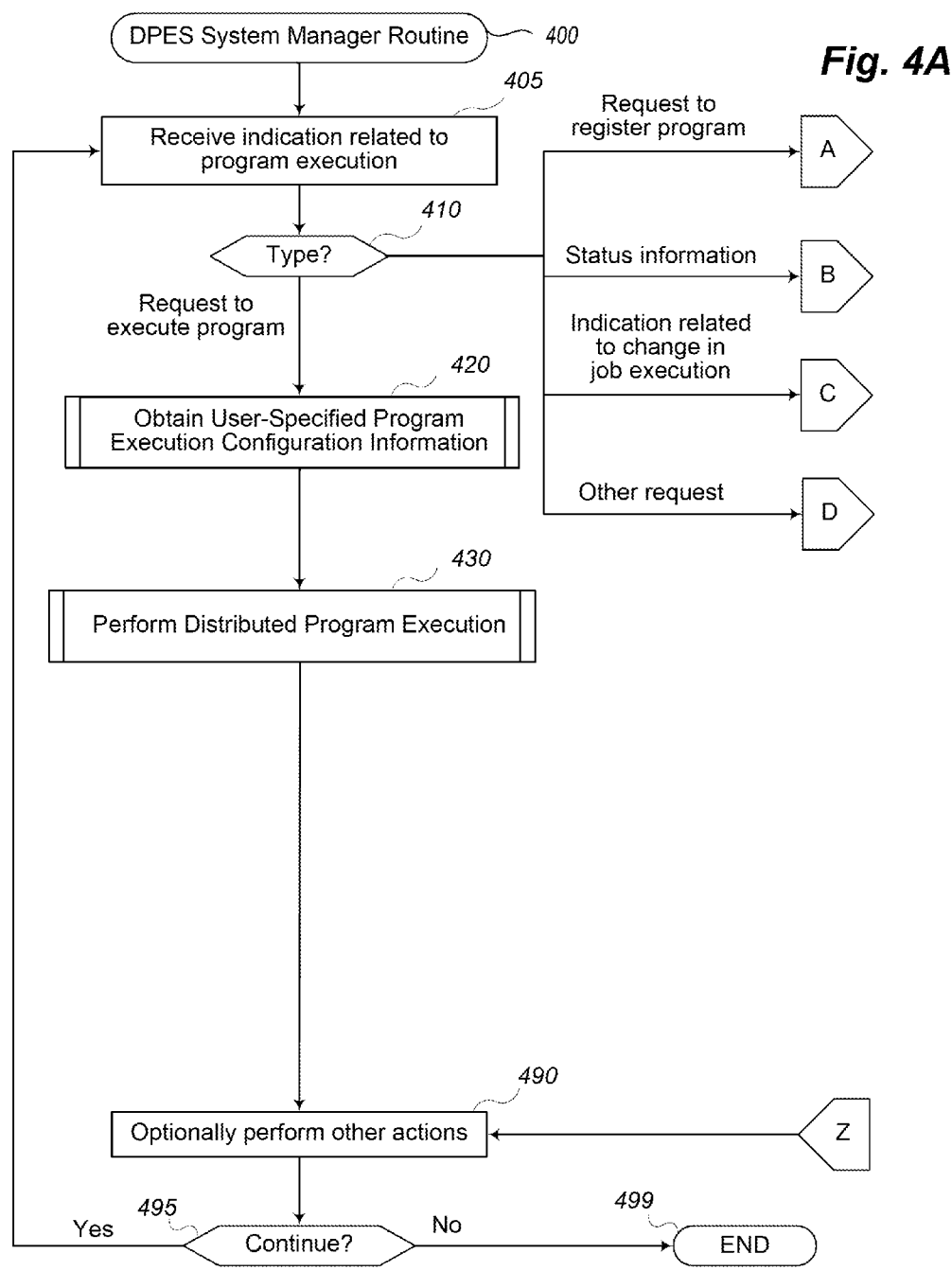

FIGS. 4A and 4B are a flow diagram of an example embodiment of a Distributed Program Execution Service System Manager routine 400. The routine may be provided by, for example, execution of the DPESSM modules 110 and 180 of FIGS. 1A and 1B, respectively, and/or the DPESSM module 340 of FIG. 3, such as to manage distributed execution of programs, as well as to perform other types of actions in some situations. In this illustrated embodiment, the routine 400 manages various aspects of use of a DPE service that performs distributed execution of programs on behalf of multiple users.

In the illustrated embodiment, the routine begins at block 405, where information related to distributed program execution is received. The routine continues to block 410 to determine the type of received information. If it is determined in block 410 that a request is received to initiate execution of a program, such as from a user, the routine continues to block 420 to execute an Obtain User-Specified Program Execution Configuration Information routine. One example of such a routine is described in greater detail with respect to FIG. 5. After the program execution configuration information is obtained in block 420, the routine continues to block 430 to execute a Perform Distributed Program Execution routine. One example of such a routine is described in greater detail with respect to FIG. 6. While the obtaining of program execution configuration information and performing of distributed program execution in blocks 420 and 430 are illustrated as being performed in a synchronous manner, such that the routine 400 does not perform other operations during those blocks, it will be appreciated that the routine may continue to perform other operations asynchronously and simultaneously with the actions of blocks 420 and 430, including to monitor and modify ongoing program execution with respect to those blocks, as well as to perform other actions with respect to executing other programs for other users, as described elsewhere.

If it was instead determined in block 410 that the information received in block 405 was a request to register a program for later use, such as from a user, the routine instead continues to block 450 to store information about the program, along with associated administrative information (e.g., information about the user who submitted the program and/or about execution of the program, such as how to separate the program into multiple execution jobs, a type of the program, etc.). In some embodiments, such programs may be registered by users before they are used, such as to increase the speed of executing the program when such a program execution request is later received. Furthermore, in some embodiments, such a request to register a program may include a request to schedule later execution of the program, such as at an indicated time or when one or more indicated criteria are satisfied (e.g., when sufficient excess computing capacity of the DPE service is available to execute the program at a low priority).

If it is instead determined in block 410 that the information received in block 405 is status information related to execution of an execution job on a computing node for a program, such as may be supplied by that computing node or execution job (e.g., after being previously requested by the routine 400 as part of block 430), the routine continues to block 455 to update status information that is maintained by the routine 400 regarding the intermediate state of execution of that execution job and program. As discussed in greater detail elsewhere, the status information may include information about particular operations that have been initiated, completed, or are in progress, information about input data that has been used by the execution, information about output data that has been generated by completion of some or all operations, information about partial intermediate data that reflects ongoing execution of the execution job, etc.

If it is instead determined in block 410 that the information received in block 405 is an indication related to modifying execution of one or more execution jobs for one or more programs, such as from a user who initiated that execution and/or as previously specified by the routine 400 with respect to block 490, the routine continues to block 460 to receive information related to the execution modification. In block 462, the routine then determines whether the request relates to a temporary termination or other suspension of one or more currently executing execution jobs, or if it is instead related to resuming execution of a previously suspended execution job. If the latter, the routine continues to block 475 to initiate the resumption of execution of a previously suspended execution job on a computing node, such as by using previously stored state information about the intermediate results from the previous partial execution of the execution job, or instead schedules a later such resumption of the execution job if so indicated in the information received in block 460.

Otherwise, if there are one or more currently executing execution jobs to be temporarily terminated, the routine continues from block 462 to block 464 to select the next such execution job, beginning with the first. In block 466, the routine then obtains information about the current intermediate state of the partial execution of the operations being performed for the execution job and about the current data state for the execution job, and in block 468 initiates the storage of the intermediate state information on one or more storage volumes remote from the computing node that will persistently store the information for later use. In other embodiments, such as if the computing node includes management software to perform such intermediate state storage actions or if the execution job itself is configured to save its own intermediate state when instructed, the routine 400 may instead in block 466 and 468 send a message to the computing node and/or execution job to initiate such storage and then shut down. Furthermore, previously saved status information about the execution job may in some situations be used in blocks 466 and 468, such as to determine what intermediate state information is be stored, and any new information obtained in block 466 (e.g., by communicating with the computing node and/or execution job) may be used to update the status information for that execution job. The routine then continues to block 470 to determine if there are more execution jobs to be terminated, and if so returns to block 464. As previously discussed, in some embodiments the temporary termination may include temporarily terminating all execution jobs currently being executed for a program, such as to temporarily suspend execution of the program.

If it is instead determined in block 470 that there are no more execution jobs to terminate, the routine in block 472 updates status information regarding the intermediate state of the terminated execution jobs, and optionally schedules a later resumption of the execution of some or all of the execution jobs from the stored intermediate state. For example, in situations in which one or more execution jobs are being moved from a first group or one or more computing nodes to a second group or one or more other computing nodes, the later scheduled resumption of the execution of those execution jobs may occur in a substantially immediate manner, such that a user may be unaware of the termination and resumption of execution or of the movement of the execution job between computing nodes. In addition, the scheduling of the later resumption may include initiating a new request to be received in block 405 at the time of the later resumption that will prompt the previously discussed resumption activities with respect to block 475 for those execution jobs.

If it instead determined in block 410 that the type of information received in block 405 is another type of request, the routine continues instead to block 480 to perform the other indicated request as appropriate. Such other requests may include, for example, administrative operations with respect to users, such as users registering with the DPE service, users checking account information or other information of the DPE service, users tracking ongoing execution of their programs (e.g., by receiving some or all information about the intermediate state or other status of one or more of the execution jobs for the program), users providing payment with respect to currently or previously requested program executions or other provided functionality, etc.

After blocks 430, 450, 455, 472, 475, or 480, the routine continues to block 490 to optionally perform one or more other tasks. Such other tasks may include, for example, one or more of the following: the DPE service automatically monitoring the execution of various programs, such as by sending requests for status information to computing nodes (e.g., periodically, when indicated criteria are satisfied, etc.);

automatically determining to temporarily terminate execution of execution jobs and/or to resume previously terminated execution of execution jobs in various circumstances, such as at scheduled times, to accommodate moving execution jobs between computing nodes, to maintain requested QoS levels for execution of a program (e.g., by maintaining execution of execution jobs within a maximum proximity to each other and/or to input data being used by the execution jobs, by maintaining a minimum proximity of execution to each other to enhance availability and reliability in the event of failure of multiple computing nodes in a single geographical location, etc.), to manage under-utilization and over-utilization of computing nodes, etc. After block 490, the routine continues to block 495 to determine whether to continue, such as until an explicit indication to terminate is received (e.g., from an operator of the DPE service). If it is determined to continue, the routine returns to block 405, and if not continues to block 499 and ends.

Figure 5:
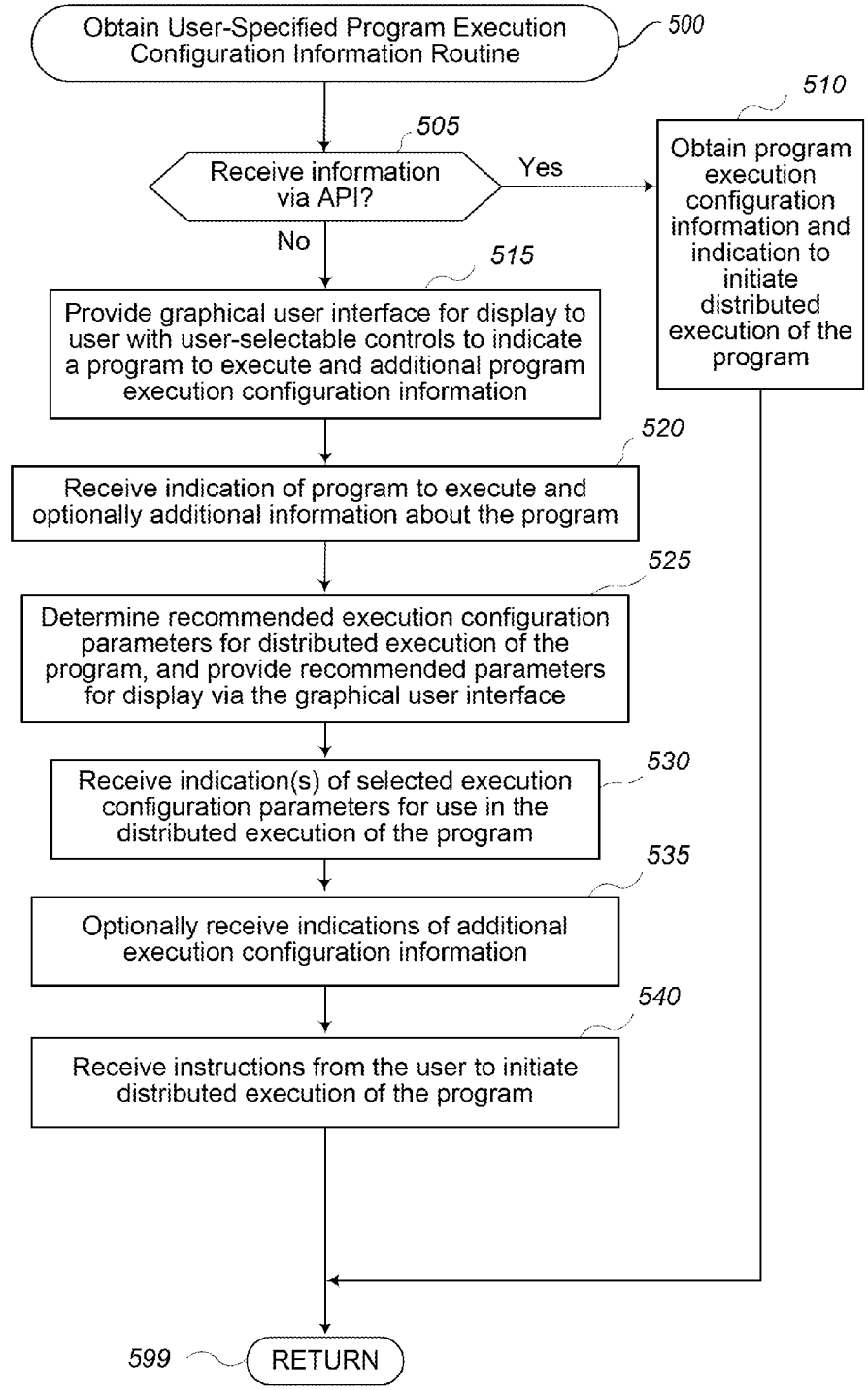
FIG. 5 illustrates a flow diagram of an example embodiment of a routine for obtaining user-specified program execution configuration information.

FIG. 5 is a flow diagram of an example embodiment of an Obtain User-Specified Program Execution Configuration Information routine 500. The routine may be provided by, for example, execution of the User Interaction Manager module 342 of the DPESSM module 340 of FIG. 3, or otherwise by the DPESSM modules 110 and 180 of FIGS. 1A and 1B, respectively, and may be initiated by block 420 of FIG. 4. The routine 500 interacts with users to determine configuration information to be used to execute indicated programs in a distributed manner on multiple computing nodes, including to determine various execution configuration parameters.

The routine begins in block 505, where an indication is received on behalf of a user regarding configuration information to be specified by the user regarding distributed execution of an indicated program. If it is determined in block 505 that the received indication is received via an API of the DPE service, the routine continues to block 510 to obtain and stored program execution configuration information via one or more API function calls, and to optionally store and aggregate such information over multiple API function calls. After the various program execution configuration information has been obtained, and an instruction is received via the API to initiate distributed execution of the indicated program in accordance with the specified configuration information, the routine in block 510 continues to block 599 and returns, including providing an indication of that specified configuration information and initiation instruction.

If it is instead determined in block 505 that the received indication is not received via an API, such as via a user interaction with a previously provided GUI of the DPE service or instead via a user request to obtain access to such a GUI, the routine continues instead to block 515 to provide (or update as appropriate) a GUI of the DPE service for display to the user, with the initial GUI screen(s) being configured to obtain information about an indicated program to execute and about various program execution configuration information. In block 520, the routine then receives information from one or more interactions of the user with the displayed GUI that indicates the program to be executed and optionally various other user-specified configuration information.

The routine then continues to block 525 to determine recommended execution configuration parameters for distributed execution of the indicated program, such as based at least in part on a type of the indicated program, and to provide an update to the displayed GUI to display information about the recommended execution configuration parameters. As described in greater detail elsewhere, the information about the recommended execution configuration parameters may be used in various manners and times in various embodiments, including for display to the user (e.g., for use as modifiable default values for the execution configuration parameters, for use in providing a warning about other user-specified execution configuration parameters, etc.). In addition, the determining of the recommended execution configuration parameters may be performed in various manners in various embodiments, such as by requesting the Program Configuration Manager module 344 of FIG. 3 to dynamically generate and provide such information, by retrieving and using stored information that was previously generated by the module 344 (e.g., as part of a preferred execution configuration parameters for a predefined template for the program type of the indicated program), etc.

In block 530, the routine then receives an indication of the selected execution configuration parameters for use in the distributed execution of the indicated program, and optionally receives indications of additional execution configuration information in block 535 (e.g., indications of input data to use for the distributed execution). The information received in blocks 530 and 535 may be based on one or more interactions of the user with the displayed GUI, such as to confirm to use some or all of the recommended execution configuration parameters, to use some or all execution configuration parameters as manually input by the user, etc. In addition, in will be appreciated that interactions with users via the GUI in blocks 515-540 may occur in various orders and across varying amounts of time, depending at least in part on choices that users make with respect to their interactions. After the various configuration information has been provided, the routine receives instructions from the user in block 540 to initiate the distributed execution of the indicated program in accordance with the specified configuration information, and continues to block 599 and returns, including providing an indication of that specified configuration information and initiation instruction.

While not illustrated here, it will be appreciated that in some embodiments a user may begin the interactions described with respect to FIG. 5, and then decide to explicitly cancel the interactions or otherwise fails to complete the interactions. In such situations, the routine may exit without providing an indication of the program execution initiation instruction (and optionally without any configuration information specified by the user before the cancellation/completion failure), and the routine 400 in FIG. 4 may instead determine to skip block 430 due to the lack of the program execution initiation instruction.

Figure 6:
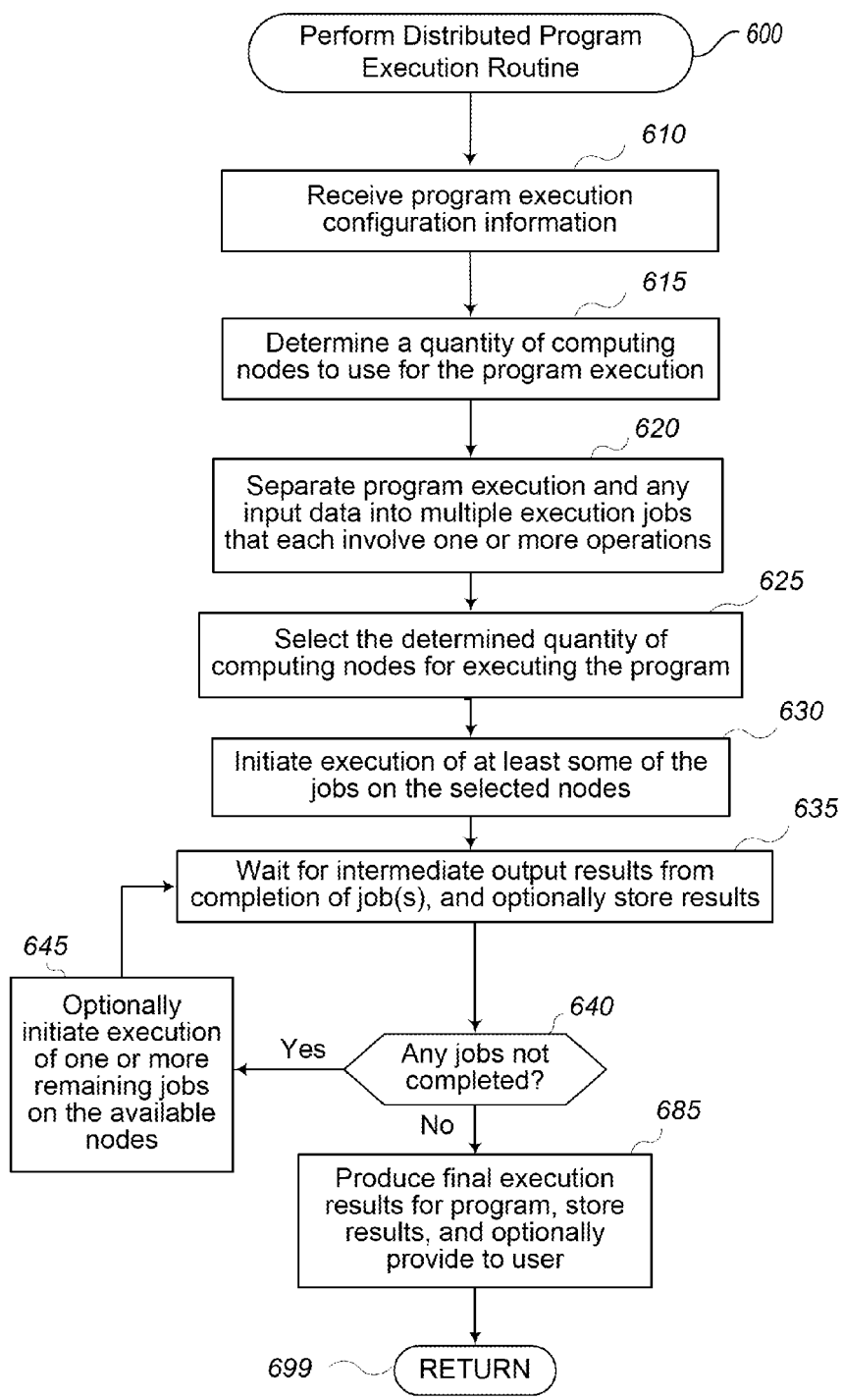
FIG. 6 illustrates a flow diagram of an example embodiment of a routine for performing distributed program execution.

FIG. 6 is a flow diagram of an example embodiment of a Perform Distributed Program Execution routine 600. The routine may be provided by, for example, execution of the DPESSM modules 110 and 180 of FIGS. 1A and 1B, respectively, and/or the DPESSM module 340 of FIG. 3, and may be initiated by block 430 of FIG. 4. The routine 600 performs operations to execute indicated programs in a distributed manner on multiple computing nodes in accordance with specified configuration information.

The routine begins in block 610, where it receives program execution configuration information for use in executing an indicated program, such as from the output of routine 500 of FIG. 5. After block 610, the routine continues to block 615 to determine a quantity of computing nodes to be used for the program execution, such as is specified in the received execution configuration information, or otherwise automatically determined (e.g., based on preferred or default configuration information, a number of computing nodes that are currently available from the DPE service, a number of computing nodes to correspond to a number of execution jobs into which the program execution will be separated, an amount of fees paid by a user on whose behalf the request is made, etc.). In block 620, the routine separates the program execution and any received input data into multiple execution jobs that each involves one or more operations to be performed. The actions in blocks 615 and 620 may be performed in various manners in various embodiments, as discussed in greater detail elsewhere. For example, the program execution separation may be performed in a manner specified in the program execution configuration information, in an automated manner based at least in part on the design of the program, etc. After block 620, the routine continues to block 625 to select the determined quantity of computing nodes for use in distributed execution of the program, and in block 630 initiates the execution of at least some of the execution jobs on the selected nodes. As discussed in greater detail elsewhere, in some embodiments a user may specify a variety of other types of information, such as may be received as part of the configuration information received in block 610 and used as part of the actions in blocks 615-630.

After block 630, the routine waits in block 635 for execution jobs to complete and to optionally provide corresponding output data, such as may be used as input data to other execution jobs and/or may be used as part or all of the final results for the execution of the program. In some embodiments, the computing nodes may supply such output information back to the routine 400, such as for storage in a long-term storage location of the DPE service, while in other embodiments the output results may instead be stored on the computing nodes, and/or stored by the computing nodes on one or more long-term storage locations remote from the computing nodes. In the illustrated embodiment, blocks 630-645 are illustrated as being performed in a synchronous manner in which the routine 600 waits for execution jobs to complete before performing other actions. It will be appreciated that in other embodiments the routine 600 may operate in other manners, such as in an asynchronous manner to perform other actions with respect to executing the current program and/or to executing other programs for other users. In addition, it will be appreciated that in some situations errors may occur that cause one or more execution jobs to fail to complete, such as due to problems with the computing node on which the execution job is being performed, due to a network connection with the computing node, due to an error in the software corresponding to performing the execution job, due to problems with input data to be used for the performance of the execution job, etc. In such situations, the routine may take various actions to correct the errors (e.g., by transferring the execution job to another computing node), but if an irreversible error occurs, the routine may terminate the further distributed execution of the program or may instead attempt to complete as much of the distributed execution of the program as possible and provide incomplete final results along with an indication that the program executed is completed with errors.

In the illustrated example routine 600, after one or more execution jobs are determined in block 635 to be completed, the routine continues to block 640 to determine whether there are more execution jobs to be executed and/or to be completed. If so, the routine continues to block 645 to optionally initiate execution of one or more remaining execution jobs on the available computing nodes, such as if those remaining execution jobs were waiting for output data from one or more of the completed execution jobs, or if instead there are more execution jobs than computing nodes and the newly available computing nodes from the completion of the other execution jobs performance are now used to execute remaining execution jobs. After block 645, the routine returns to block 635 to wait for completion of other execution jobs.

If it is instead determined in block 640 that all of the execution jobs have completed, the routine continues to block 685 to produce final execution results for the program, and to optionally store those final results and/or provide them to the user. The final execution results may be generated or otherwise produced in various manners in various embodiments, such as by combining output results from multiple execution jobs in various ways, selecting the output results from a single execution job to use, etc. After block 685, the routine continues to block 699 and returns.

Figure 7:
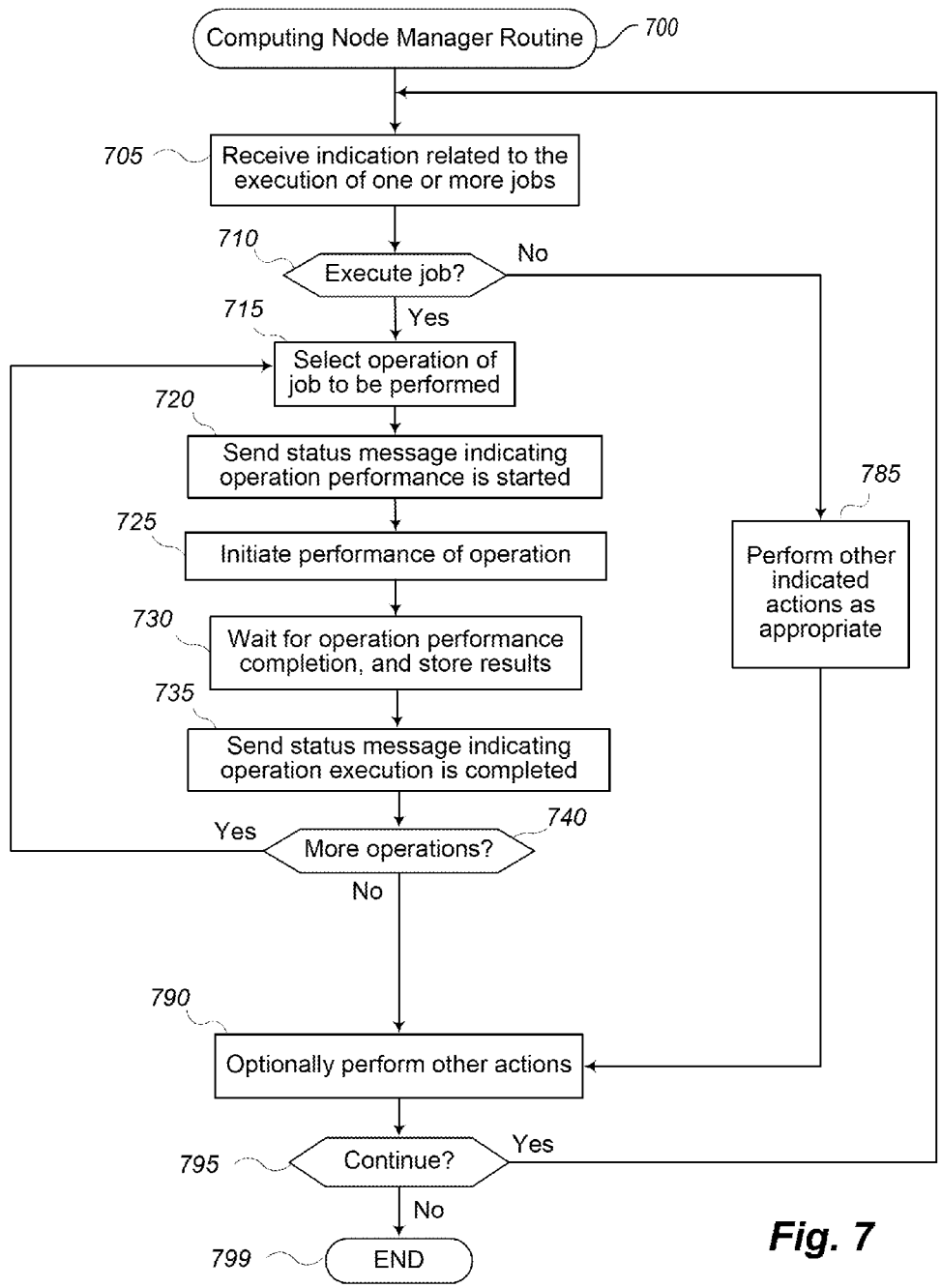
FIG. 7 illustrates a flow diagram of an example embodiment of a Computing Node Manager routine.

FIG. 7 is a flow diagram of an example of a Computing Node Manager routine 700. The routine may be provided by, for example, execution of module 179 of FIG. 1B, or of other management software executing on computing nodes 120 of FIG. 1A, computing systems 182 of FIG. 1B, computing nodes 360 of FIG. 3, etc. In the illustrated embodiment, the management software on a computing node manages some aspects of the execution of execution jobs on the computing node, while in other embodiments some or all of the functionality described with respect to FIG. 7 may instead be performed by the System Manager routine 400 of FIGS. 4A and 4B, or instead by an execution job that is being executed on the computing node.

In the illustrated embodiment, the routine begins at block 705, where an indication is received related to the execution of one or more execution jobs on the computing node. The routine continues to block 710 to determine whether the indication is to initiate execution of an indicated execution job. If so, the routine determines the multiple operations to be performed for the execution job (e.g., based on the information received about the execution job in block 705 or that is otherwise retrieved from an external source), and continues to block 715 to select the next operation to be performed, beginning with the first. Blocks 715-740 are illustrated in this example embodiment as being performed in a serial manner, such that each operation is individually performed in a synchronous manner before the next operation is initiated, although it will be appreciated that in other embodiments the operations may be performed in other manners, such as to execute some or all of the operations in parallel and/or in an asynchronous manner.

After block 715, the routine continues to block 720 to send a status message to the routine 400 indicating that the execution of the selected operation has begun, and in block 725 initiates the performance of the operation. In block 730, the routine waits for the completion of the performance of the operation, and optionally locally stores any intermediate results produced by the operation performance. In block 735, the routine then sends another status message to the routine 400 indicating that the performance of the operation is completed. In block 740, the routine then determines whether there are more operations to be performed, and if so returns to block 715.

If was instead determined in block 710 that the received indication in block 705 was not to execute an execution job, the routine continues instead to block 785 to perform one or more other indicated operations as appropriate. For example, the information received in block 705 may be a request for status information from the routine 400, and if so block 785 may obtain and provide that status information to the routine

400. Alternatively, the information in block 705 may be an indication to terminate execution of the execution job, and the actions performed in block 785 may include corresponding actions (e.g., to clear intermediate state information that was temporarily stored on the computing node, such as after that information has been persistently stored elsewhere). In addition, actions performed with respect to block 785 may include a request from the routine 400 to initiate such persistent storage of intermediate state from partial execution of operations for a currently executing execution job, and if so the actions in block 785 may include performing such actions (whether immediately or instead after a short time to allow completion of performance of one or more operations). Furthermore, in some embodiments and situations, different execution jobs may coordinate in various manners, such as by exchanging information of interest, and the information in block 705 may be such information from another execution job of the program or a request from such other execution job for information from the current execution job.

After block 785, or if it is instead determined in block 740 that there are no more operations to be performed, the routine continues to block 790 to optionally perform one or more other tasks, such as to coordinate with other execution jobs of the program if appropriate, to take administrative actions as part of executing the execution job, etc. After block 790, the routine continues to block 795 to determine whether to continue, such as until an explicit indication to terminate is received (e.g., from the routine 400 or from a human operator of the DPE service). If it is determined to continue, the routine returns to block 705, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving, by one or more computing systems configured to provide a program execution service, configuration information from a client that indicates a program to be executed in a distributed manner, that indicates a quantity of computing nodes provided by the program execution service to be used for execution of the program, and that indicates one or more of a group that includes a specified type of computing node to use for execution of the program and a specified geographical location of computing nodes to use for execution of the program;
selecting, by the one or more configured computing systems of the program execution service, multiple computing nodes of the indicated quantity from a plurality of computing nodes provided by the program execution service, and provisioning the multiple computing nodes for use in the execution of the program; and
initiating, by the one or more configured computing systems of the program execution service, the execution of the program for the client on the multiple computing nodes.

2. The computer-implemented method of claim 1 wherein the plurality of computing nodes provided by the program execution service include multiple types of computing nodes having differing computing resources, wherein the configuration information indicates the specified type of computing node from the multiple types, and wherein the selecting of the multiple computing nodes includes selecting computing nodes from the plurality of computing nodes that are of the specified computing node type.

3. The computer-implemented method of claim 1 wherein the plurality of computing nodes provided by the program execution service include computing nodes in multiple geographical locations, wherein the configuration information indicates the specified geographical location of computing nodes to use for execution of the program, wherein the specified geographical location is one of the multiple geographical locations, and wherein the selecting of the multiple computing nodes includes selecting computing nodes from the plurality of computing nodes that are in the specified geographical location.

4. The computer-implemented method of claim 1 wherein the plurality of computing nodes provided by the program execution service include computing nodes in multiple geographical locations, wherein the configuration information indicates the specified geographical location by specifying information about relative locations of the multiple computing nodes to each other, and wherein the selecting of the multiple computing nodes includes selecting computing nodes from the plurality of computing nodes that satisfy the specified relative locations.

5. The computer-implemented method of claim 1 wherein the receiving of the configuration information further includes receiving information about relative locations of the multiple computing nodes to a specified target, and wherein the selecting of the multiple computing nodes includes selecting computing nodes from the plurality of computing nodes that satisfy the specified relative locations.

6. The computer-implemented method of claim 1 wherein the receiving of the configuration information further includes receiving specified input data from the client for use by the program during the execution, wherein the provisioning of the multiple computing nodes includes providing access of the multiple computing nodes to the specified input data, and wherein the initiating of the execution of the program includes executing the program on the multiple computing nodes and providing the specified input data to the executing program.

7. The computer-implemented method of claim 1 wherein the receiving of the configuration information further includes receiving information about multiple execution jobs to perform during the execution of the program, and wherein the initiating of the execution of the program includes performing the multiple execution jobs on the multiple computing nodes as part of the execution.

8. The computer-implemented method of claim 1 wherein the plurality of computing nodes provided by the program execution service include multiple types of computing nodes having differing computing resources and include computing nodes in multiple geographical locations, wherein the configuration information indicates one or more specified computing node types from the multiple types, indicates one or more specified geographical locations from the multiple geographical locations, and includes information about relative locations of the multiple computing nodes to one or more indicated targets, and wherein the selecting of the multiple computing nodes includes selecting computing nodes from the plurality of computing nodes that are of the one or more specified computing node types and that are in the one or more specified geographical locations and that satisfy the specified relative locations.

9. The computer-implemented method of claim 1 further comprising providing, by the one or more configured computing systems of the program execution service, a graphical user interface of the program execution service to a computing device of the client, and wherein at least some of the configuration information from the client is received via one or more interactions of the client with the provided graphical user interface.

10. The computer-implemented method of claim 9 further comprising:
determining, by the one or more configured computing systems of the program execution service, multiple recommended execution configuration parameters to use for executing the program; and
presenting, by the one or more configured computing systems of the program execution service and via the provided user interface, information to the client about the recommended execution configuration parameters for executing the program;
and wherein the receiving of the configuration information from the client includes receiving information from one or more interactions of the client with the user interface to use at least one of the recommended execution configuration parameters, and wherein the initiating of the execution of the program includes executing the program on the multiple computing nodes and using the at least one recommended execution configuration parameter as part of the executing.

11. The computer-implemented method of claim 10 wherein the recommended execution configuration parameters include a recommended quantity of computing nodes, wherein the at least one recommended execution configuration parameter includes the recommended quantity of computing nodes, and wherein the method further comprises, before the presenting of the information to the client about the recommended execution configuration parameters, monitoring, by the one or more configured computing systems, prior execution of other programs by the program execution service, and generating, by the one or more configured computing systems, the multiple recommended execution configuration parameters from the monitoring.

12. The computer-implemented method of claim 1 wherein the selecting of the multiple computing nodes includes selecting one or more physical computing systems provided by the program execution service that each hosts multiple virtual machines, and wherein the provisioning of the multiple computing nodes includes storing information on each of the selected one or more physical computing systems to configure the selected one or more physical computing systems to manage one or more hosted virtual machines on each of the selected one or more physical computing systems as part of the multiple computing nodes.

13. A non-transitory computer-readable medium having stored contents that cause a computing system of a program execution service to perform a method comprising, the method comprising:
receiving, by the computing system of the program execution service, information from a client about a program to be executed in a distributed manner on computing nodes provided by the program execution service;
providing, by the computing system of the program execution service, information to the client about recommended execution configuration parameters for executing the program, including a recommended quantity of computing nodes to use for execution of the program;
receiving, by the computing system of the program execution service, further information from the client that indicates to use one or more of the recommended execution configuration parameters for the execution of the program, the indicated one or more recommended execution configuration parameters including the recommended quantity of computing nodes;
selecting, by the computing system of the program execution service, multiple computing nodes of the recommended quantity from a plurality of computing nodes provided by the program execution service, the selecting of the multiple computing nodes including selecting the multiple computing nodes in accordance with additional information received from the client indicating one or more of a group that includes a specified computing node type to use for the execution of the program and a specified geographical location of computing nodes to use for the execution of the program; and
initiating, by the computing system of the program execution service and based at least in part on the indicated one or more recommended execution configuration parameters, the execution of the program in the distributed manner on the multiple computing nodes.

14. The non-transitory computer-readable medium of claim 13 wherein the plurality of computing nodes provided by the program execution service include multiple types of computing nodes having differing computing resources, wherein the additional information received from the client indicates the specified computing node type from the multiple types, and wherein the selecting of the multiple computing nodes in accordance with the additional information received from the client includes selecting computing nodes from the plurality of computing nodes that are of the specified computing node type.

15. The non-transitory computer-readable medium of claim 13 wherein the plurality of computing nodes provided by the program execution service include computing nodes in multiple geographical locations, wherein the additional information received from the client indicates the specified geographical location from the multiple geographical locations, and wherein the selecting of the multiple computing nodes in accordance with the additional information received from the client includes selecting computing nodes from the plurality of computing nodes that are in the specified geographical location.

16. The non-transitory computer-readable medium of claim 13 wherein the stored contents include software instructions that, when executed, further cause the computing system to provide a graphical user interface of the program execution service to a computing device of the client, and wherein at least some information received from the client is via one or more interactions of the client with the provided graphical user interface.

17. A system comprising:
one or more hardware processors of one or more computing systems; and
one or more memories with stored instructions of an execution service that, when executed by at least one of the one or more hardware processors, cause the at least one hardware processor to:
receive information from a client that indicates a program to be executed in a distributed manner using computing resources provided by the execution service and that indicates one or more of a group that includes (a) one or more specified quantities of one or more types of computing resources to be used for execution of the program and (b) one or more specified geographical locations of computing resources to be used for execution of the program;
select, from a plurality of computing resources provided by the execution service and in accordance with the information received from the client, multiple computing resources to be used for execution of the program; and
execute the program for the client on the multiple computing resources.

18. The system of claim 17 wherein the plurality of computing resources provided by the program execution service include a plurality of computing nodes, wherein the received information includes an indication of a specified quantity of computing nodes, and wherein the selecting of the multiple computing resources includes selecting computing nodes from the plurality of computing nodes that are of the specified quantity.

19. The system of claim 17 wherein the plurality of computing resources provided by the program execution service include computing resources in multiple geographical locations, wherein the received information includes an indication of the one or more specified geographical locations of computing resources to be used for execution of the program from the multiple geographical locations, and wherein the selecting of the multiple computing resources includes selecting computing resources from the plurality of computing resources that are in the one or more specified geographical locations.

20. The system of claim 17 wherein the stored instructions include software instructions that, when executed, further cause the system to provide a graphical user interface of the execution service to a computing device of the client, and wherein at least some of the information received from the client is via one or more interactions of the client with the provided graphical user interface.

\* \* \* \* \*